(12) United States Patent
Bito et al.

(10) Patent No.: US 8,181,715 B2
(45) Date of Patent: May 22, 2012

(54) POWER TOOL

(75) Inventors: Shinya Bito, Anjo (JP); Takuro Konishi, Anjo (JP)

(73) Assignee: Makita Corporation, Anjo-shi (JP)

(*) Notice: Subject to any disclaimer, the term of this patent is extended or adjusted under 35 U.S.C. 154(b) by 289 days.

(21) Appl. No.: 12/591,743

(22) Filed: Nov. 30, 2009

(65) Prior Publication Data

US 2010/0132969 A1 Jun. 3, 2010

(30) Foreign Application Priority Data

Dec. 3, 2008 (JP) ................................ 2008-308685

(51) Int. Cl.
*B25D 17/24* (2006.01)
(52) U.S. Cl. .................. 173/162.1; 173/162.2; 173/201; 173/210; 173/211; 173/212; 267/136; 267/137; 92/85 R
(58) Field of Classification Search ............... 173/162.1, 173/162.2, 201, 210–212; 267/136–137; 92/85 R
See application file for complete search history.

(56) References Cited

U.S. PATENT DOCUMENTS

| | | | | |
|---|---|---|---|---|
| 3,451,492 A | * | 6/1969 | Blomberg et al. | 173/162.2 |
| 4,478,293 A | * | 10/1984 | Weilenmann et al. | 173/162.2 |
| 6,907,943 B2 | * | 6/2005 | Ikuta | 173/117 |
| 7,252,157 B2 | * | 8/2007 | Aoki | 173/162.2 |
| 7,712,548 B2 | * | 5/2010 | Moessnang | 173/162.1 |
| 2006/0076154 A1 | * | 4/2006 | Aoki | 173/212 |

FOREIGN PATENT DOCUMENTS

| | | |
|---|---|---|
| EP | 1 792 692 A2 | 6/2007 |
| JP | A-2004-154903 | 6/2004 |
| JP | A-2006-62039 | 3/2006 |
| WO | WO 2007/105742 A1 | 9/2007 |

OTHER PUBLICATIONS

Feb. 26, 2010 Search Report issued in European Patent Application No. 09014956.8.

* cited by examiner

*Primary Examiner* — Rinaldi I. Rada
*Assistant Examiner* — Michelle Lopez
(74) *Attorney, Agent, or Firm* — Oliff & Berridge, PLC

(57) ABSTRACT

A power tool according to the invention includes a dynamic vibration reducer having a body, a weight and elastic elements. The body is formed by a plurality of cylindrical members which are coaxially disposed to face each other. The elastic elements exert biasing forces on the cylindrical members such that the cylindrical members are held apart from each other. The cylindrical members are fixed to the tool body side under the biasing forces of the elastic elements. Venting members for forced vibration are provided on the cylindrical members and protrude radially outward from the cylindrical members, respectively. The venting members are mounted by inserting into venting member mounting parts on the tool body side in a direction transverse to the longitudinal direction of the cylindrical members. At least one of the venting members can move with respect to the cylindrical member in the longitudinal direction.

12 Claims, 18 Drawing Sheets

POWER TOOL

BACKGROUND OF THE INVENTION

1. Field of the Invention

The invention relates to a power tool such as a hammer with a dynamic vibration reducer.

2. Description of the Related Art

Japanese non-examined laid-open Patent Publication No. 2006-62039 discloses a dynamic vibration reducer mounted to a tool body. The dynamic vibration reducer serves to reduce vibration during a hammering operation by a tool bit and is particularly of a forced vibration type that forcibly drives a weight by utilizing pressure fluctuations within a crank chamber that houses a crank mechanism for driving a bit.

The known dynamic vibration reducer is engaged with an engagement part of the tool body via movement of the both spring receivers with respect to the cylindrical members, so that the dynamic vibration reducer is attached to the tool body.

Because the dynamic vibration reduce is provided with the tool body that hoses numbers of driving mechanisms, size reduction of the dynamic vibration reducer is desired.

SUMMARY OF THE INVENTION

Accordingly, it is an object of the invention to reduce size of a dynamic vibration reducer of a power tool.

Above-described object can be achieved by the claimed invention. A representative power tool according to the invention includes a tool body that houses an actuating mechanism for linearly driving a tool bit, and a dynamic vibration reducer that is mounted to the tool body and serves to reduce vibration caused when the tool bit is driven. Representative power tool according to the invention may be an impact tool such as a hammer and a hammer drill. The dynamic vibration reducer has a body, a weight housed within the body to move in a longitudinal direction of the body, and elastic elements to connect the weight to the body. The body includes a plurality of cylindrical members coaxially disposed to face each other and the cylindrical members are assembled into the body such that the cylindrical members can move with respect to each other in the longitudinal direction. Each elastic element exerts biasing force on the cylindrical members such that the cylindrical members are held apart from each other. Further, the cylindrical members are supported on the tool body side in the state in which at least one of the cylindrical members is directly subjected to the biasing force of the associated elastic element. The "elastic element" according to the invention may preferably be defined by a coil spring.

A venting member for a forced vibration is provided on each of the cylindrical members and protrudes radially outward from the cylindrical member. The venting member is mounted by inserting into a venting member mounting part on the tool body side in a direction transverse to the longitudinal direction of the cylindrical member. At least one of the venting members can move with respect to the one cylindrical member in the longitudinal direction. In an impact tool in which the actuating mechanism has, for example, a crank mechanism that converts rotational output of the motor to linear motion and a striking element that is driven via an air spring action by the crank mechanism, the "venting member for forced vibration" may be provided by utilizing pressure fluctuations caused when the crank mechanism is driven in order to effect forced vibration of the weight of the dynamic vibration reducer.

As described above, according to the invention, the body of the dynamic vibration reducer is formed by assembling the plurality of the cylindrical members such that the cylindrical members can move with respect to each other in the longitudinal direction, and the cylindrical members are supported on the tool body side under the biasing forces of the elastic elements. In other words, each of the cylindrical members also has a function of a conventional elastic element receiving member fixed to the tool body. Therefore, the elastic element receiving member can be dispensed with, and the dynamic vibration reducer can be correspondingly reduced in the length in the longitudinal direction and thus can be reduced in size. As a result, it is made easier to ensure an installation space for the dynamic vibration reducer on the tool body side.

Further, in addition to the above-described construction, at least one of the venting members provided on the cylindrical members can move with respect to the cylindrical member in the longitudinal direction. With such a construction, when the dynamic vibration reducer is mounted to the tool body, even if variations are caused in production or assembly between the spacing between the venting member mounting parts and the spacing between the venting members of the dynamic vibration reducer, it is made possible to mount the venting members to the venting member mounting parts while accommodating the variations. Thus, ease of mounting the dynamic vibration reducer to the tool body can be enhanced.

According to a further embodiment of the invention, the cylindrical member is fixed inward of an elastic element receiving surface that receives the biasing force of the elastic element and toward the center in the longitudinal direction by a securing part provided on the tool body, under the biasing force of the elastic element. With such a construction, the dynamic vibration reducer can be supported within the range of its longitudinal length, so that it is made easier to secure an installation space for the dynamic vibration reducer on the tool body side.

According to a further embodiment of the invention, the venting member is formed on a cylindrical slide sleeve and the slide sleeve is fitted onto the cylindrical member and can slide in the longitudinal direction of the cylindrical member. With such a construction, positional adjustment of the venting member with respect to the venting member mounting part can be performed in its longitudinal direction, so that variations can be rationally accommodated.

According to a further embodiment of the invention, the tool body includes two housings that house the actuating mechanism and the dynamic vibration reducer is mounted astride the two housings. For example, when the power tool is an impact tool which performs a hammering operation or a hammer drill operation on a workpiece, one of the housings is a barrel that houses a striking mechanism for applying a striking force to the tool bit, and the other housing is a crank housing that houses a crank mechanism. The invention can be suitably applied to an impact tool of the type which has a tool body in which the dynamic vibration reducer is disposed astride two housings.

According to a further embodiment of the invention, the venting member is formed by a separate member from the cylindrical member and elastically mounted to the cylindrical member. Here, the manner in which the venting member is "elastically mounted to the cylindrical member" may be defined by the manner in which the venting member is mounted to the cylindrical member via an elastic member such as rubber such that it is allowed to move at least in the longitudinal direction of the cylindrical member, and the manner in which the venting member itself is formed by an elastically deformable material. With the above-described construction, the variation accommodating effect can be obtained when the dynamic vibration reducer is mounted to the tool body.

According to a further embodiment of the invention, the venting member is formed by a rubber pipe. With such a construction, production cost can be reduced and the cylindrical member needs not be radially increased in size.

According to a further embodiment of the invention, the tool body includes two housings that house the actuating mechanism and the dynamic vibration reducer is mounted to one of the two housings. When the power tool is an impact tool which performs a hammering operation or a hammer drill operation on a workpiece, one of the housings may be a barrel that houses a striking mechanism for applying a striking force to the tool bit, and the other housing may be a crank housing that houses a crank mechanism. The invention can preferably be applied to a large sized impact tool in which the longitudinal length of the one housing corresponds to that of the dynamic vibration reducer.

According to a further embodiment of the invention, a sealing part for sealing an inner space of the body from an outside of the body is provided on the cylindrical member inward of the elastic element receiving surface that receives the biasing force of the elastic element and toward the center in the longitudinal direction. An O-ring can be suitably used to form the sealing part.

Other objects, features and advantages of the present invention will be readily understood after reading the following detailed description together with the accompanying drawings and the claims.

DETAILED DESCRIPTION OF THE INVENTION

Each of the additional features and method steps disclosed above and below may be utilized separately or in conjunction with other features and method steps to provide and manufacture improved power tools and method for using such power tools and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

First Representative Embodiment

Figure 9:
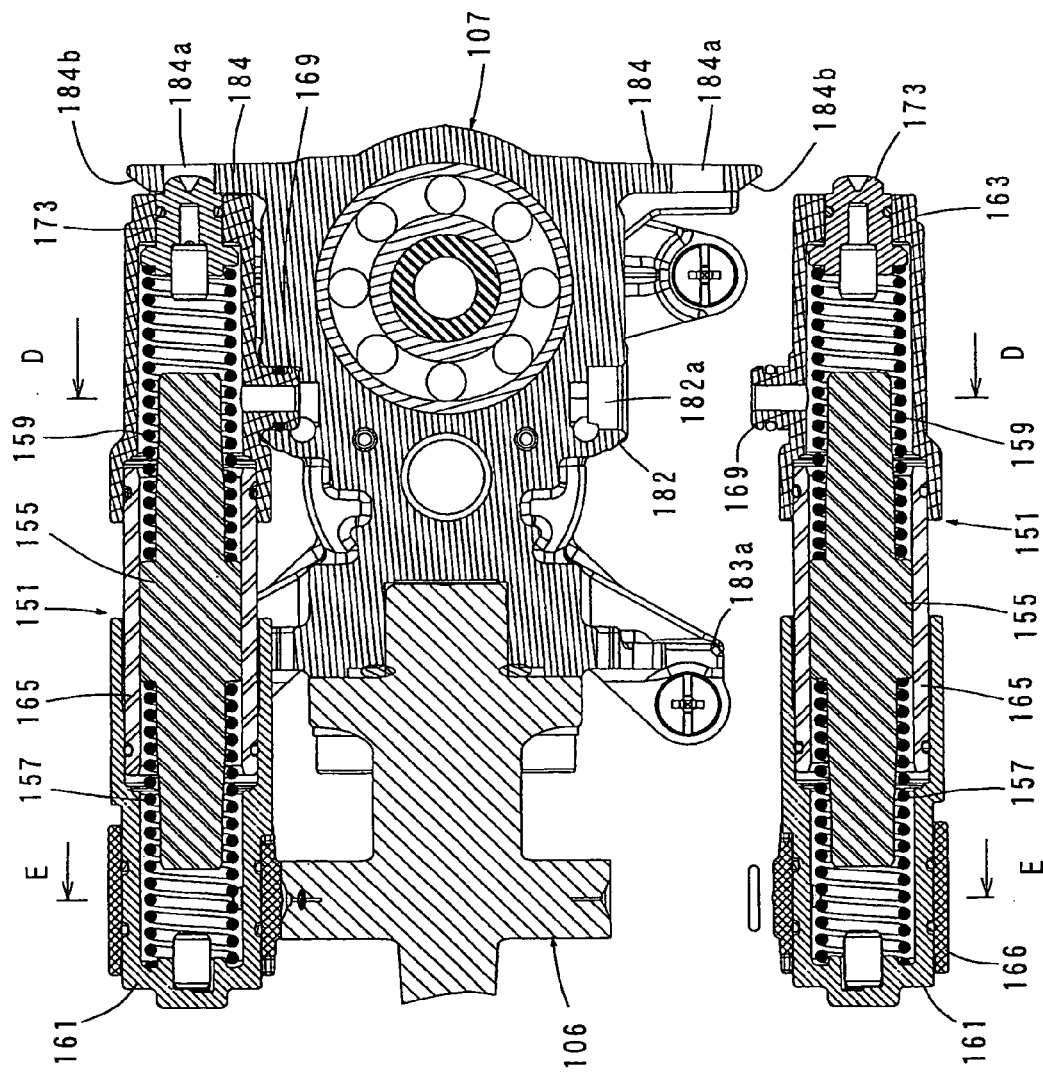
FIG. 9 is a sectional plan view illustrating mounting of the dynamic vibration reducer to a body.
Figure 10:
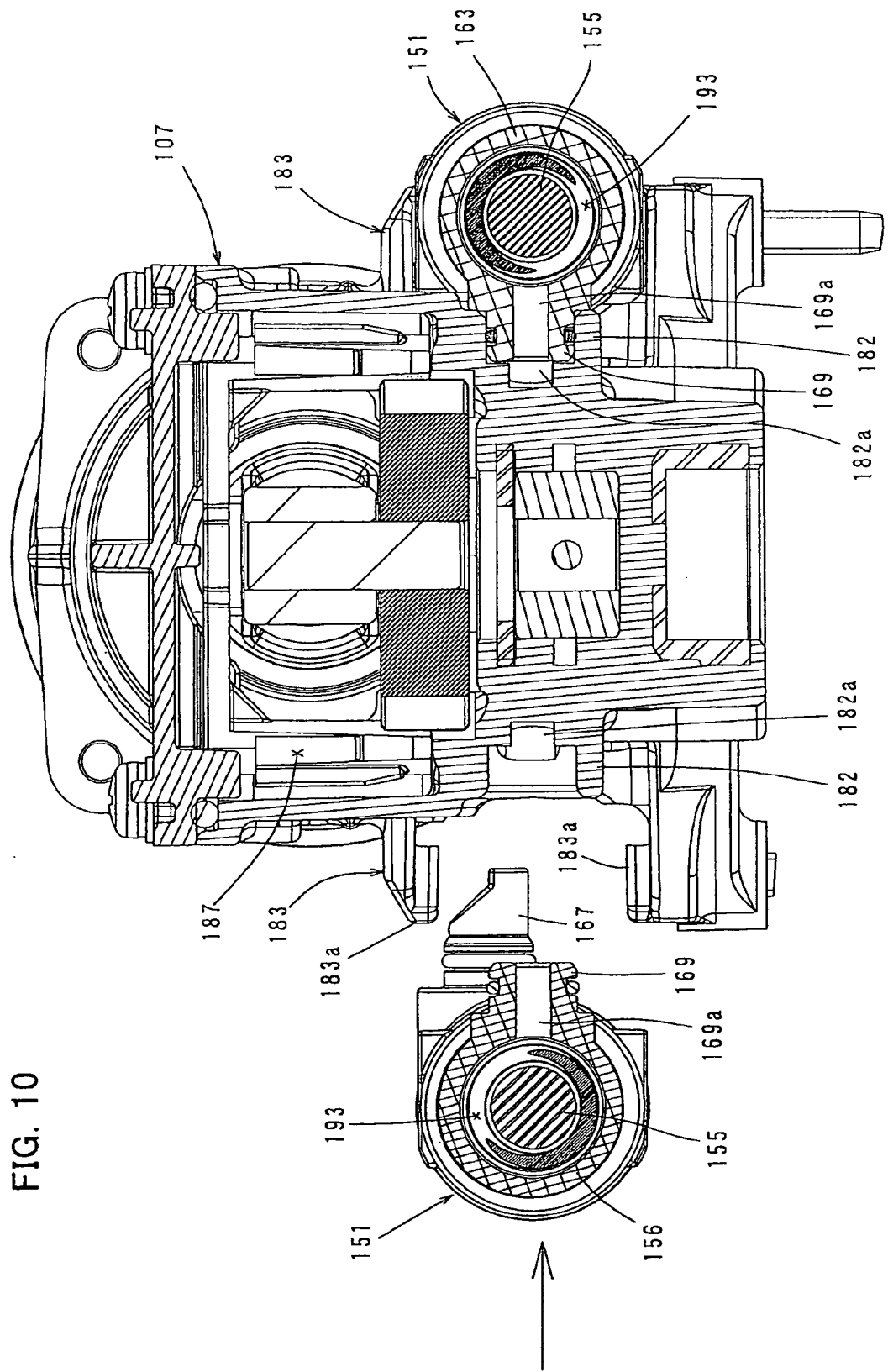
FIG. 10 is a sectional view taken along line D-D in FIG. 9.
Figure 11:
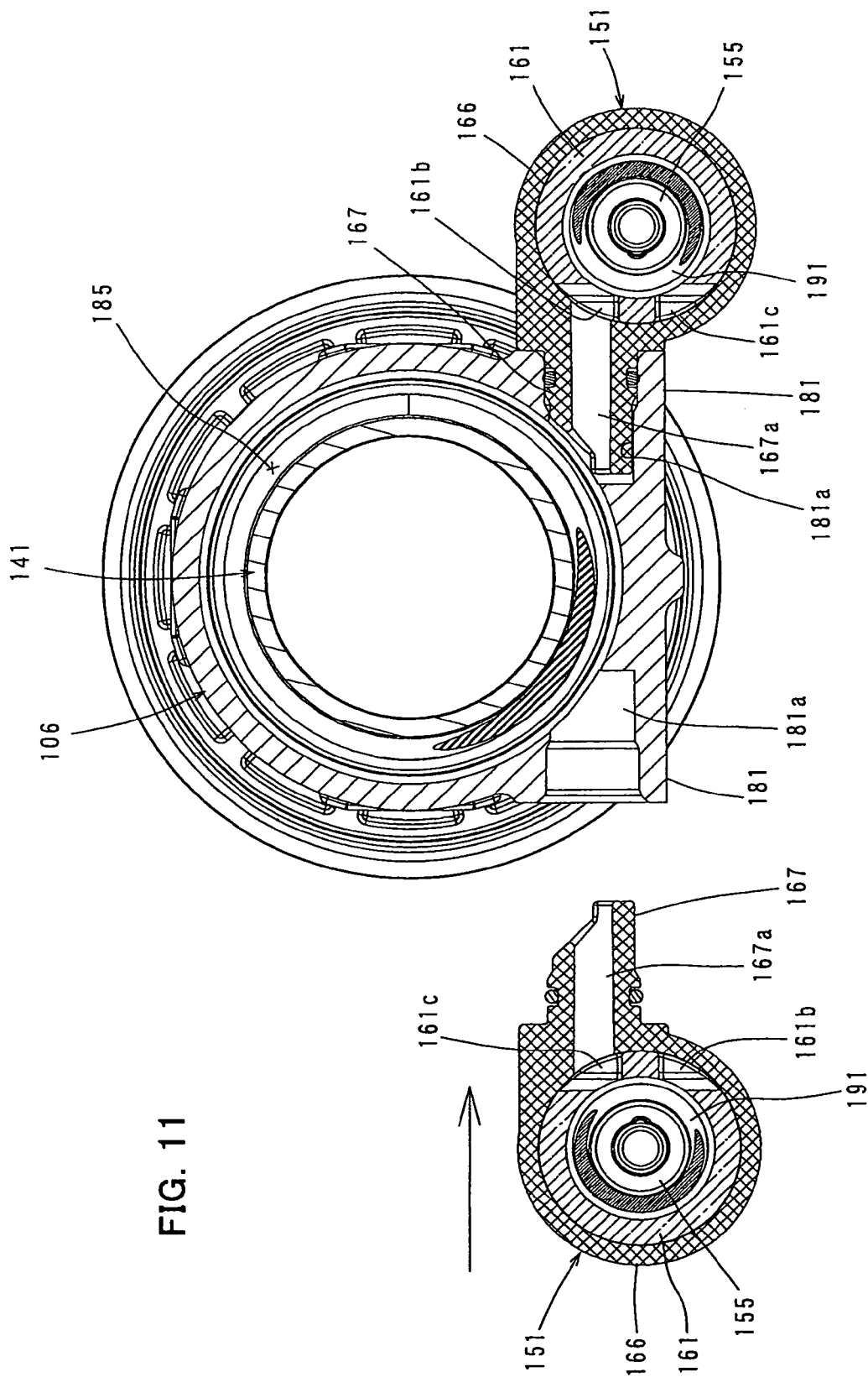
FIG. 11 is a sectional view taken along line E-E in FIG. 9.

A first representative embodiment of the invention is now described with reference to FIGS. 1 to 11. In this embodiment, an electric hammer is explained as a representative example of a power tool according to the invention. FIGS. 1 to 4 mainly show an entire electric hammer 101. FIGS. 5 to 8 show a structure of a dynamic vibration reducer, and FIGS. 9 to 11 show a mounting structure of the dynamic vibration reducer. As shown in FIGS. 1 to 4, the representative electric hammer 101 includes a body 103 that forms an outer shell of the electric hammer 101 and a hammer bit 119 detachably coupled to a tip end region of the body 103 via a tool holder 137. The body 103 and the hammer bit 119 are features that correspond to the "tool body" and the "tool bit", respectively, according to the invention.

The body 103 of the electric hammer 103 includes a motor housing 105 that houses a driving motor (not shown), a crank housing 107 that houses a motion converting mechanism (not shown) formed by a crank mechanism and is connected to an upper end of the motor housing 105, a cylindrical barrel 106 that houses a striking mechanism formed by a striker and an impact bolt and is connected to a front end of the crank housing 107 in a longitudinal direction of the body 103 (in an axial direction of the hammer bit 119), a housing cover 108 that covers outer surfaces of the crank housing 107 and the barrel 106, and a handgrip 109 that is connected to the crank housing 107 and the motor housing 105 on the rear end side (on the side opposite to the hammer bit 119). For the sake of convenience of explanation, in a horizontal position of the electric hammer 101 in which the longitudinal direction of the body 103 (the axial direction of the hammer bit 119) coincides with the horizontal direction, the side of the hammer bit 119 is taken as the front and the side of the handgrip 109 as the rear.

A slide switch 109*a* is provided on an upper connection of the handgrip 109 which is connected to the crank housing 107 (substantially the housing cover 108) such that it can slide in a horizontal direction transverse to the longitudinal direction of the body 103, and the driving motor can be started or stopped by sliding the slide switch 109*a*. A rotational output of the driving motor is appropriately converted to a linear motion via the motion converting mechanism and transmitted to the striking mechanism. Thus, an impact force is generated in the axial direction of the hammer bit 119 via the striking mechanism.

Further, the motion converting mechanism (not shown) serves to convert the rotation of the driving motor to the linear motion and transmit it to the striking mechanism, and is formed by a crank mechanism including a crank shaft driven by the driving motor, a crank arm and a piston. The piston forms a driving element for driving the striking mechanism and can slide in the same direction as the axial direction of the hammer bit 119 within the cylinder 141 (see FIG. 4) housed in the barrel 106.

Further, the striking mechanism (not shown) is slidably disposed within a bore of the cylinder 141 and mainly includes a striking element in the form of the striker and an intermediate element in the form of the impact bolt. The striker is driven via an air spring action of an air chamber which is caused by a sliding movement of the piston, and the impact bolt is slidably disposed within the tool holder 137 and transmits a kinetic energy of the striker to the hammer bit 119.

In this embodiment, dynamic vibration reducers 151 are disposed on the right and left sides of the axis of the hammer bit 119 in an upper region of the body 103. Specifically, dynamic vibration reducer housing spaces 115 are defined between the right and left outer surfaces of the crank housing 107 and the barrel 106 and the housing cover 108 that covers the outer surfaces. The dynamic vibration reducers 151 are disposed within the right and left dynamic vibration reducer housing spaces 115 such that the longitudinal direction of the dynamic vibration reducers 151 is parallel to the longitudinal direction of the body 103 (the axial direction of the hammer bit 119). The dynamic vibration reducers 151 are mounted astride the crank housing 107 and the barrel 106 and extend along the right and left outer surfaces of the crank housing 107 and the barrel 106, and thereafter covered by the housing cover 108.

The structure of the dynamic vibration reducers 151 and the structure of mounting the dynamic vibration reducers 151 to the body 103 are now described mainly with reference to FIGS. 5 to 11. FIGS. 5 to 8 show the detailed structure of the dynamic vibration reducers 151. Further, the right and left dynamic vibration reducers 151 are identical in structure. Each of the dynamic vibration reducers 151 mainly includes an elongate hollow cylindrical body 153, a weight disposed within the cylindrical body 153 and biasing springs 157, 159 which are disposed on the right and left sides of the weight 155 in order to connect the weight 155 to the cylindrical body 153. The cylindrical body 153, the weight 155 and the biasing springs 157, 159 are features that correspond the "body", the "weight" and the "elastic element", respectively, according to the invention.

The cylindrical body 153 includes a front first cylindrical part 161, a rear second cylindrical part 163 and an inner cylindrical part 165 between the first and second cylindrical parts. The first cylindrical part 161 and the second cylindrical part 163 are opposed to each other and fitted onto the inner cylindrical part 165 such that they can slide in the circumferential and longitudinal directions with respect to the outer circumferential surface of the inner cylindrical part 165. Specifically, the cylindrical body 153 of this embodiment is formed by assembling the first cylindrical part 161, the second cylindrical part 163 and the inner cylindrical part 165 such that they can move with respect to each other in the longitudinal direction. Further, a sealing member in the form of an O-ring 164 for preventing air leakage is disposed between mating surfaces of the first and second cylindrical parts 161, 163 and the inner cylindrical part 165. The first cylindrical part 161 and the second cylindrical part 163 are features that correspond to the "plurality of cylindrical members" according to the invention.

Figure 1:
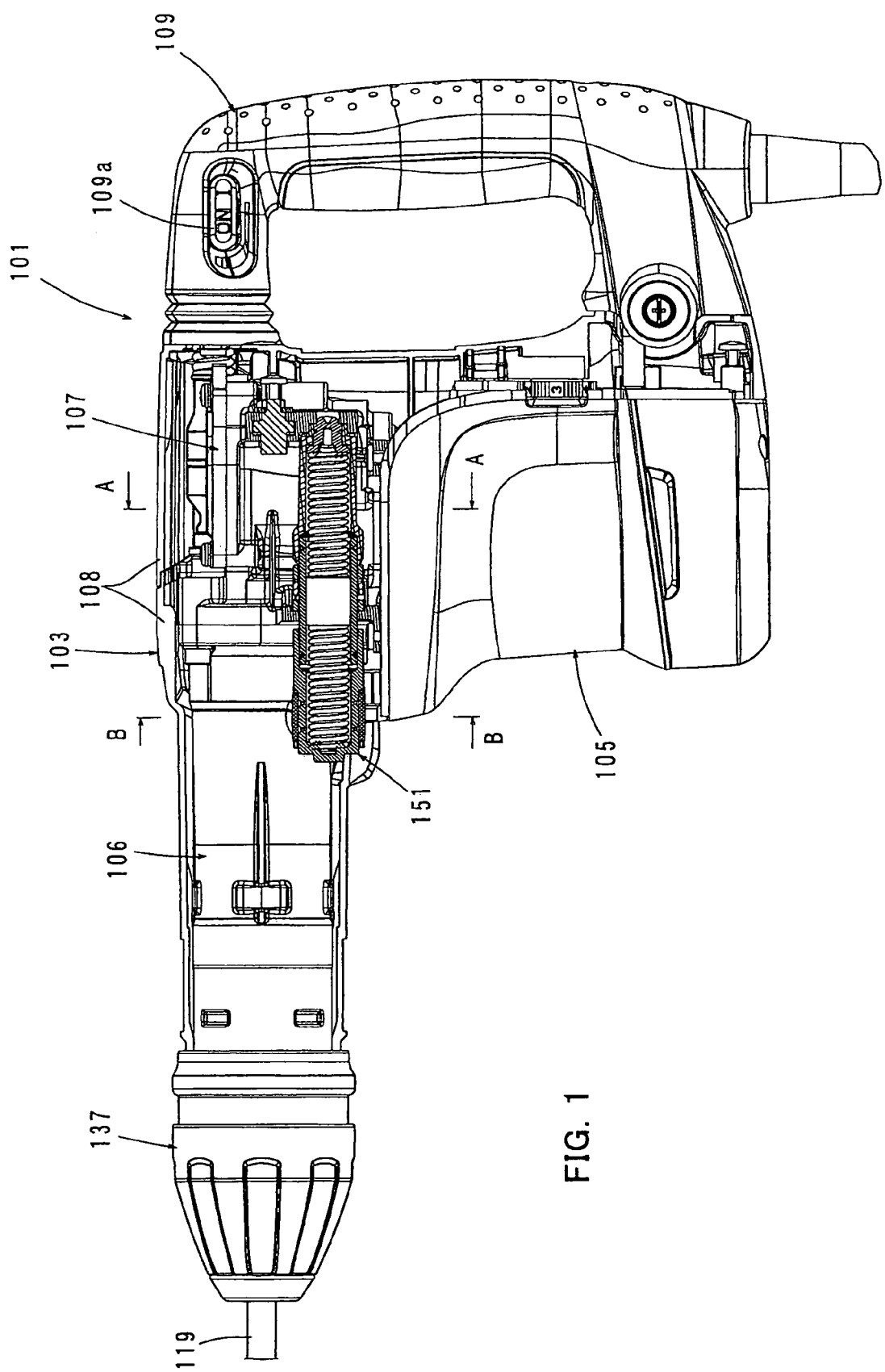
FIG. 1 is a cutaway side view showing an entire electric hammer according to a first embodiment of the invention.
Figure 2:
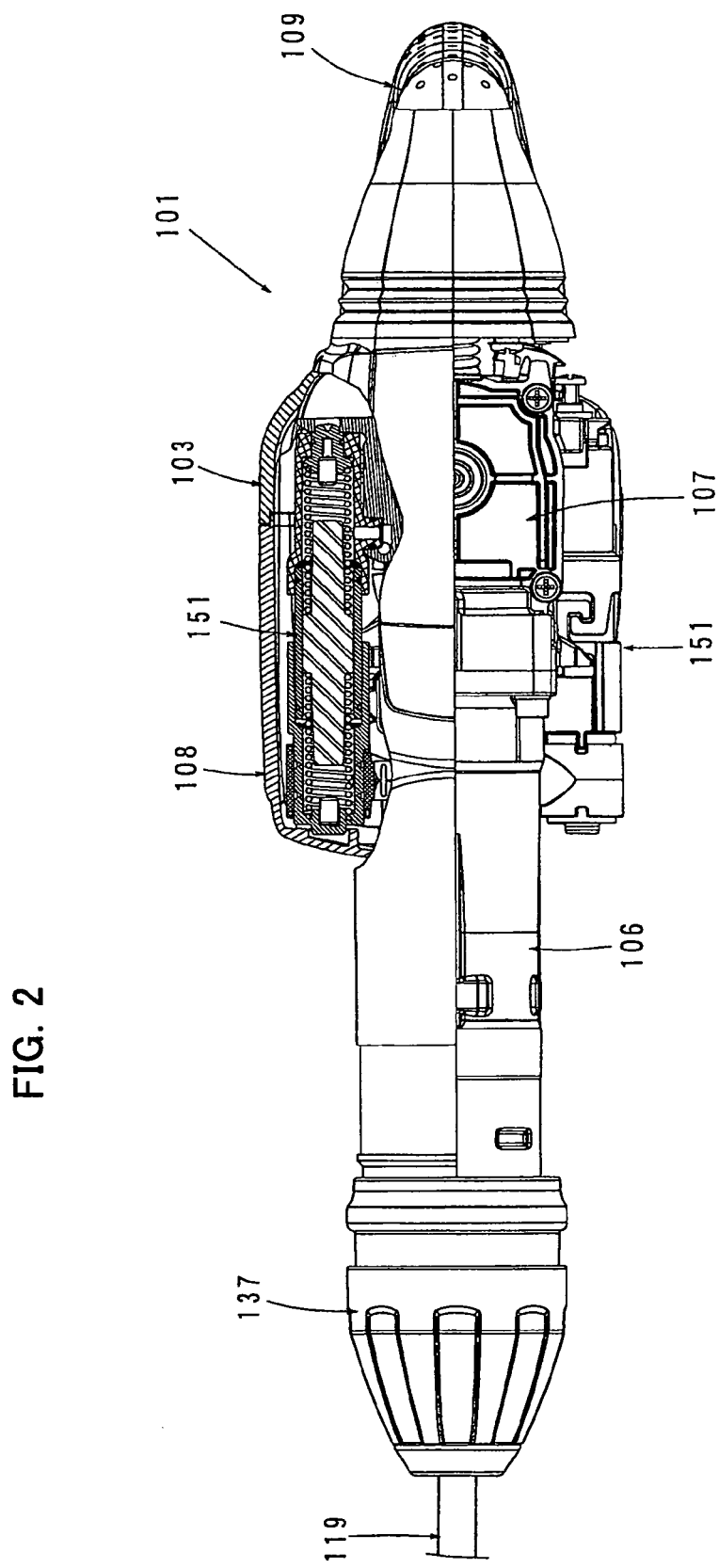
FIG. 2 is a cutaway plan view also showing the entire electric hammer.
Figure 3:
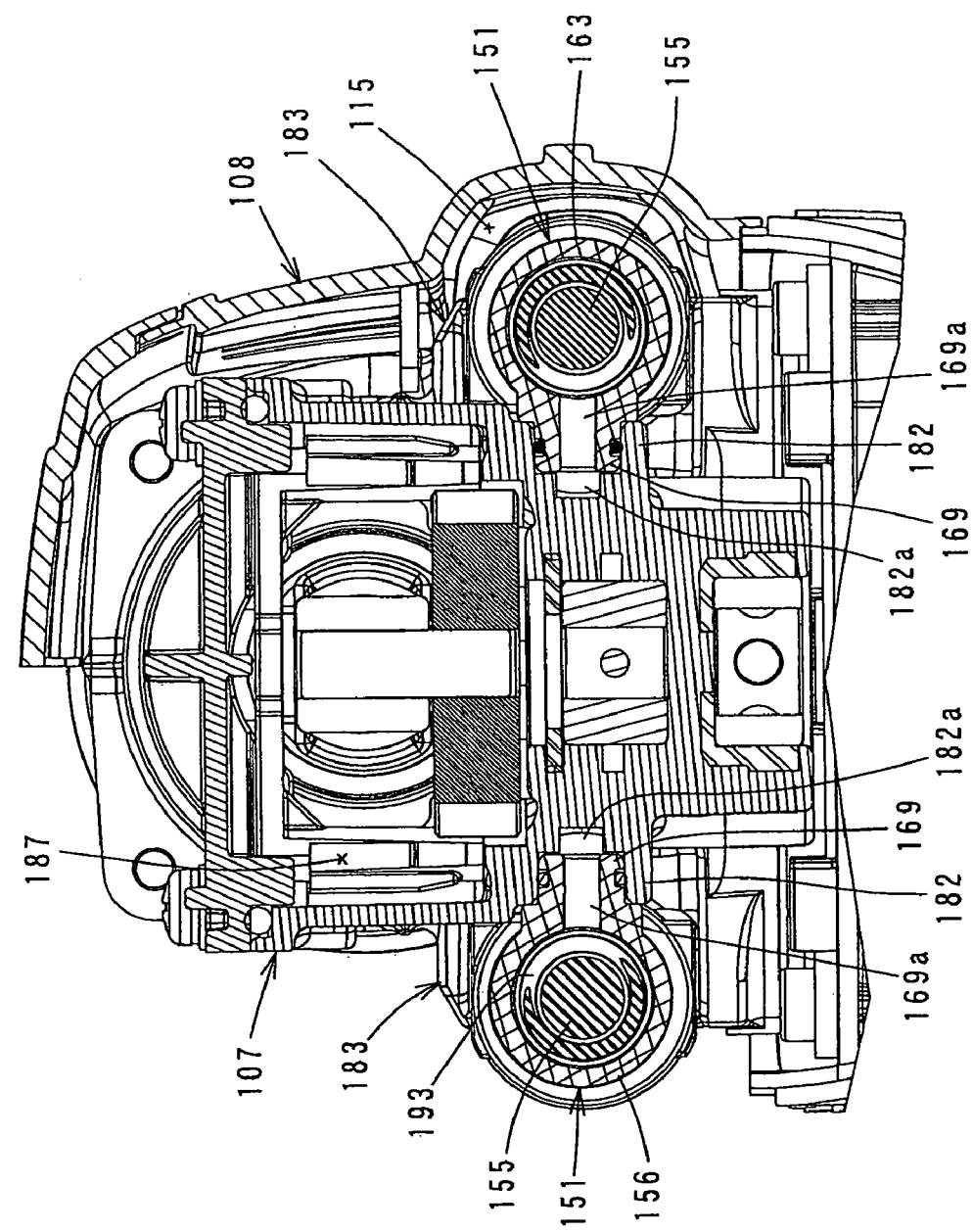
FIG. 3 is a sectional view taken along line A-A in FIG. 1.
Figure 4:
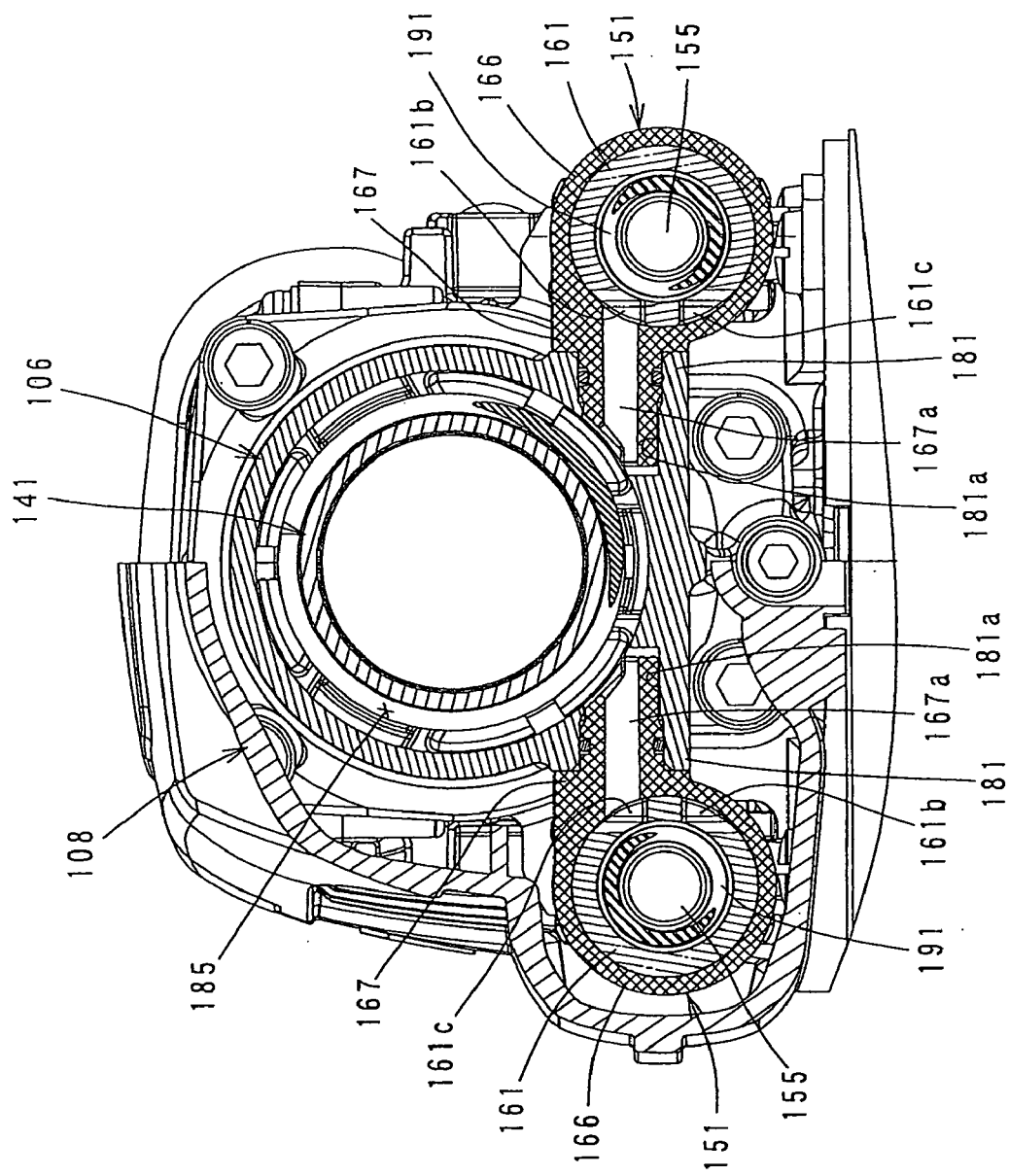
FIG. 4 is a sectional view taken along line B-B in FIG. 1.
Figure 5:
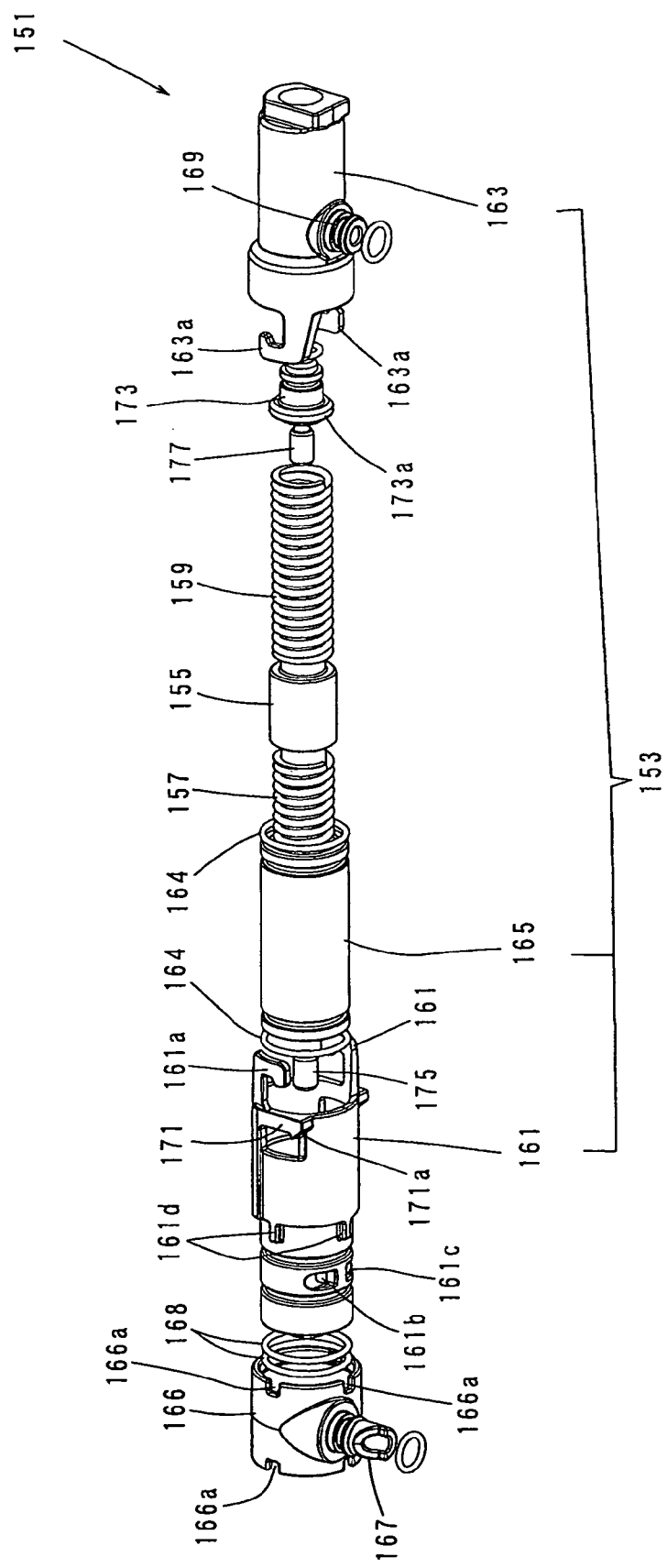
FIG. 5 is an exploded perspective view showing the construction of a dynamic vibration reducer.
Figure 6:
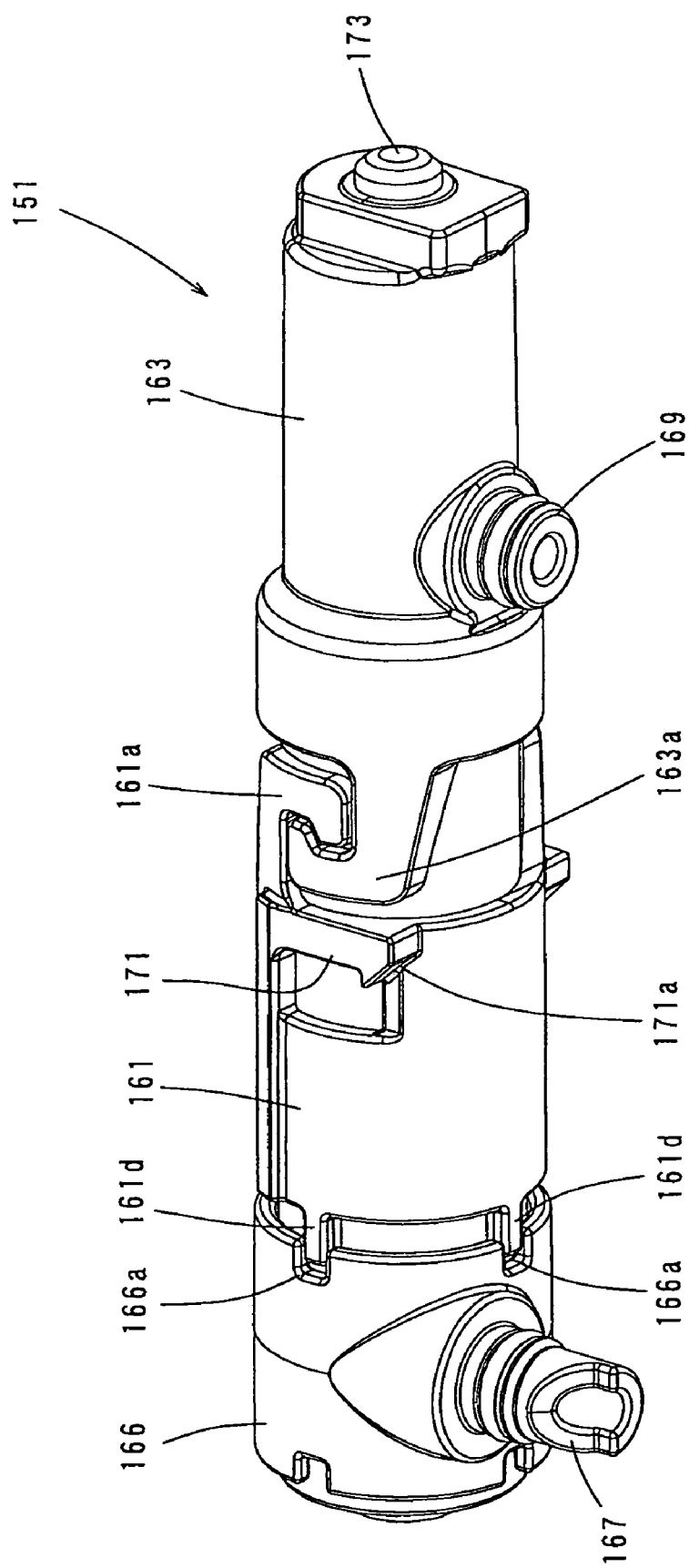
FIG. 6 is a perspective view of the dynamic vibration reducer in an assembled state.
Figure 7:
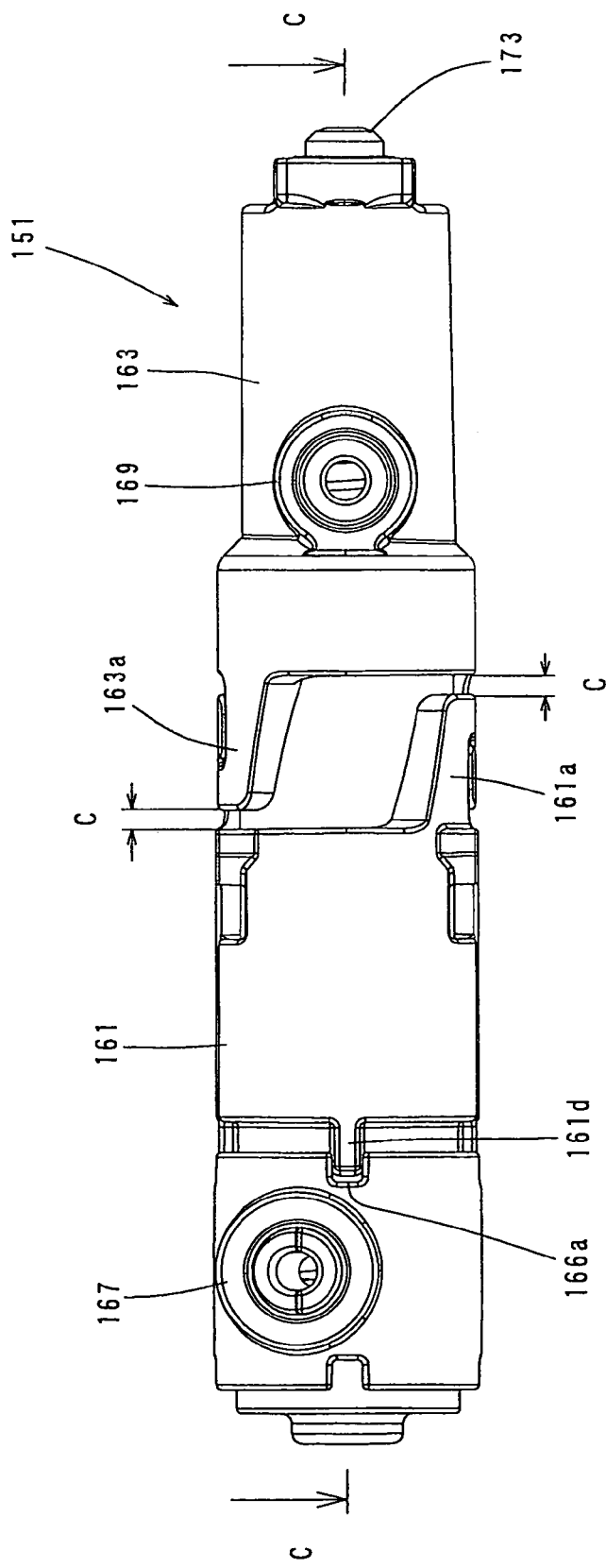
FIG. 7 is a plan view of the dynamic vibration reducer.

As shown in FIGS. 5 and 6, the first cylindrical part 161 and the second cylindrical part 163 are connected to each other via latch-like (hook-like) engaging parts 161a, 163a which are engaged with each other at ends of the cylindrical parts which face each other in the longitudinal direction. The engaging part 161a of the first cylindrical part 161 and the engaging part 163a of the second cylindrical part 163 extend with a predetermined length from respective end surfaces of the cylindrical parts in the longitudinal direction. The engaging parts 161a and 163a are engaged with each other by moving the both cylindrical parts 161, 163 with respect to each other in a circumferential direction in the state in which the cylindrical parts 161, 163 are held close to each other (in the state in which the end surface of the one cylindrical part is held in contact with a tip end of the engaging part of the other cylindrical part). Thus, the first cylindrical part 161 and the second cylindrical part 163 are connected to each other. Therefore, by moving the first cylindrical part 161 and the second cylindrical part 163 with respect to each other in the opposite circumferential direction, the engaging parts 161a, 163a are disengaged from each other, so that the first cylindrical part 161 and the second cylindrical part 163 are disconnected from each other. FIG. 5 shows a disassembled state of the dynamic vibration reducer 151, and FIGS. 6 and 7 show an assembled state of the dynamic vibration reducer 151 with the first cylindrical part 161 and the second cylindrical part 163 connected to each other.

The engaging movement of the engaging parts 161a, 163a for connecting the first cylindrical part 161 and the second cylindrical part 163 is performed against spring forces of the biasing springs 157, 159. As shown in FIGS. 6 and 7, in the state in which the first cylindrical part 161 and the second cylindrical part 163 are connected to each other with the engaging parts 161a, 163a engaged with each other, predetermined clearances C are defined between the end surfaces of the first and second cylindrical parts 161, 163 and the opposed end surfaces of the engaging parts 161a, 163a in the longitudinal direction, so that the first cylindrical part 161 and the second cylindrical part 163 can be moved with respect to each other in the longitudinal direction within the range of the clearances C. Thus, the entire cylindrical body 153 can expand and contract in the longitudinal direction within the range of the clearances C. Further, the amount of the clearance C is determined in consideration of dimensional errors (variations) in production or assembly which are caused between a spacing between female connection ports 181, 182 on the body 103 which are described below and a spacing between male connection ports 167, 169 on the dynamic vibration reducer 151.

The first cylindrical part 161 is provided with a male connection port 167 having a vent hole 167a which communicates with an inner space 191 of the first cylindrical part 161, and the second cylindrical part 163 is provided with a male connection port 169 having a vent hole 169a which communicates with an inner space 193 of the second cylindrical part 163. The male connection ports 167, 169 are formed on the outside of the first cylindrical part 161 and the second cylindrical part 163, respectively, and protrude radially outward therefrom. The male connection ports 167, 169 are connected to the body 103 of the electric hammer 101, or specifically to the female connection ports 181, 182 formed in the barrel 106 and the crank housing 107 and having respective vent holes 181a, 182a. The male connection ports 167, 169 and the female connection ports 181, 182 are features that correspond to the "venting member for forced vibration" and the "venting member mounting portion", respectively, according to the invention.

The front male connection port 167 on the first cylindrical part 161 side is formed on an outer sleeve 166 which is slidably fitted on the other end of the first cylindrical part 161 in the longitudinal direction. The outer sleeve 166 is a feature that corresponds to the "slide sleeve" according to the invention. The rear male connection port 169 on the second cylindrical part 163 side is integrally formed with the second cylindrical part 163 and protrudes horizontally along a horizontal line transverse to the center of the second cylindrical part 163 (see FIGS. 3 and 10). Further, a plurality of recesses 166*a* are formed on the longitudinal end surface of the outer sleeve 166 and arranged in the circumferential direction. Projections 161*d* are formed on the outer surface of the first cylindrical part 161 and engaged with the recesses 166*a* with a predetermined clearance in the longitudinal direction. With this construction, the outer sleeve 166 is allowed to move in the longitudinal direction with respect to the first cylindrical part 161, but prevented from moving in the circumferential direction with respect to the first cylindrical part 161. Further, the outer sleeve 166 is fitted onto a front small-diameter portion of the first cylindrical part 161 and designed such that its outer circumferential surface is substantially flush with the outer circumferential surface of a large-diameter portion of the first cylindrical part 161.

The male connection port 167 of the outer sleeve 166 protrudes horizontally along a horizontal line which runs through a point displaced above from the center of the outer sleeve 166 (the center of the first cylindrical part 161). Further, the vent hole 167*a* of the male connection port 167 communicates with upper one of the two communication holes 161*b*, 161*c* formed in the first cylindrical part 161 (see FIGS. 4 and 9). Specifically, the first cylindrical part 161 has two upper and lower communication holes 161*b*, 161*c* formed on the sides opposed to the outer surface of the body 103 in the state in which the dynamic vibration reducer 151 is mounted on the body 103. In the first cylindrical part 161 of the right dynamic vibration reducer 151, the communication hole 161*b* communicates with the vent hole 167*a* of the male connection port 167, and in the first cylindrical part 161 of the left dynamic vibration reducer 151, the other communication hole 161*c* communicates with the vent hole 167*a* of the male connection port 167. By provision of the two upper and lower communication holes 161*b*, 161*c* in the first cylindrical part 161, the first cylindrical part 161 can be used in common for the right dynamic vibration reducer 151 and the left dynamic vibration reducer 151. Further, the outer sleeve 166 is formed in plane symmetry with respect to a vertical plane in a direction of the center line of the vent hole 167*a* of the male connection port 167, so that the outer sleeve 166 can also be used in common for the right and left dynamic vibration reducers 151.

Further, a sealing member in the form of an O-ring 168 is disposed between the outer circumferential surface of the first cylindrical part 161 and the inner circumferential surface of the outer sleeve 166. The O-ring 168 serves to prevent air from leaking out through a joint between the communication holes 161*b*, 161*c* and the vent hole 167*a* of the male connection port 167.

In the state in which the dynamic vibration reducer 151 is not yet attached to the body 103, as described above, the cylindrical body 153 is held expanded at a maximum (in the state shown in FIG. 7) by spring forces of the biasing springs 157, 159. Therefore, at this time, the spacing between the both male connection ports 167, 169 is maximized. The spacing between the both male connection ports 167, 169 can be adjusted by the longitudinal movement of the outer sleeve 166 with respect to the first cylindrical part 161 and the longitudinal movement of the second cylindrical part 163 with respect to the inner cylindrical part 165.

Figure 8:
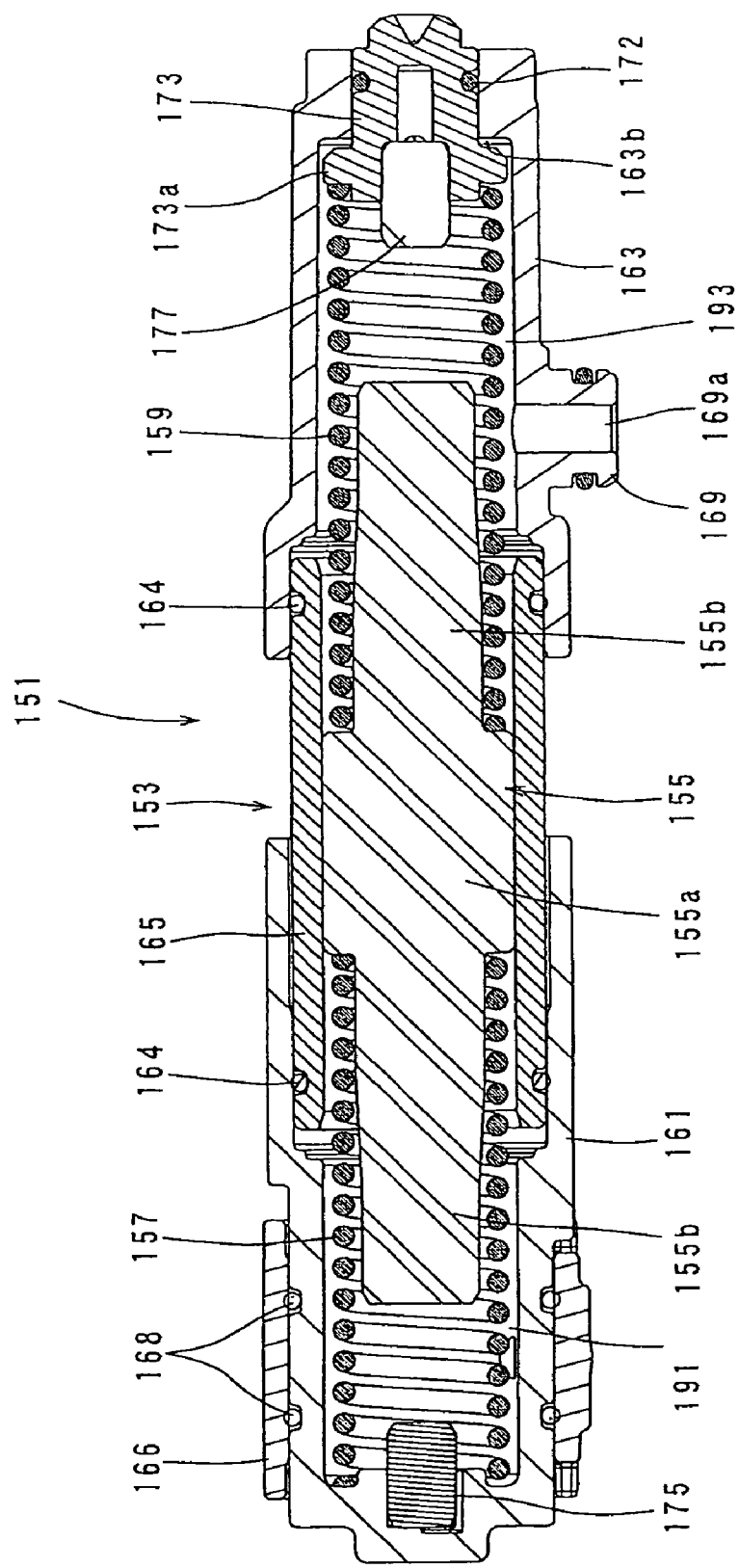
FIG. 8 is a sectional view taken along line C-C in FIG. 7.

As shown in FIG. 8, an elastic element receiving member in the form of a spring receiver 173 for receiving the spring force of the biasing spring 159 is provided on the longitudinal other end (on the end of the dynamic vibration reducer 151) of the rear second cylindrical part 163. The spring receiver 173 is fitted into the other end portion of the second cylindrical part 163 such that the spring receiver 173 can move with respect to the second cylindrical part 163 in the longitudinal direction of the second cylindrical part 163, and the end of the spring receiver 173 protrudes outside through the open end surface of the other end of the second cylindrical part 163. Further, a flange 173*a* of the spring receiver 173 is normally held in contact with a stepped surface 163*b* formed on the inner circumferential surface of the second cylindrical part 163, so that the spring receiver 173 is prevented from slipping out of the second cylindrical part 163. Furthermore, the spring receiver 173 is provided with a rubber stopper 177 which defines the rearmost position to which the weight 155 can be moved. Further, a sealing member in the form of an O-ring 172 for preventing air leakage is disposed between the mating surfaces of the spring receiver 173 and the second cylindrical part 163.

The front first cylindrical part 161 has a closed other end and is formed in a cylindrical shape having a bottom, and this bore bottom receives a spring force of the biasing spring 157. Specifically, the first cylindrical part 161 has functions of both the second cylindrical part 163 and the spring receiver 173. Further, a rubber stopper 175 is provided on the bore bottom of the first cylindrical part 161 and defines the foremost position to which the weight 155 can be moved.

The weight 155 has a large-diameter portion 155*a* and small-diameter portions 155*b* disposed on the both sides of the large-diameter portion 155*a*, and the large-diameter portion 155*a* slides on the inner circumferential surface of the inner cylindrical part 165. The biasing springs 157, 159 are disposed on the both sides of the large-diameter portion 155*a* in the direction of its movement. The biasing springs 157, 159 are formed by compression coil springs. As for the biasing spring 157 on the first cylindrical part 161 side, one end is held in contact with the bore bottom of the first cylindrical part 161 and the other end is held in contact with the end surface of the large-diameter portion 155*a* of the weight 155 in the longitudinal direction. As for the biasing spring 159 on the second cylindrical part 163 side, one end is held in contact with the spring receiver 173 and the other end is held in contact with the end surface of the large-diameter portion 155*a* of the weight 155 in the longitudinal direction. Thus, the biasing springs 157, 159 exert the spring forces on the weight 155 toward each other when the weight 155 moves in the longitudinal direction of the cylindrical body 153 (in the axial direction of the hammer bit 119).

In order to mount the dynamic vibration reducer 151 constructed as described above on the body 103, two securing parts 183, 184 are provided on each of the right and left side surface regions of the crank housing 107. Further, the female connection ports 181, 182 are provided on each of the right and left side surface regions of the barrel 106 and each of the right and left side surface regions of the crank housing 107, respectively, in order to be connected to the male connection ports 167, 169 of the dynamic vibration reducer 151. In this embodiment, the male connection port 167 on the first cylindrical part 161 side is connected to the female connection port 181 on the barrel 106 side, and the male connection port 169 on the second cylindrical part 163 side is connected to the female connection port 182 on the crank housing 107 side. The securing part 183 serves to directly support the first cylindrical part 161, and the other securing part 184 serves to support the spring receiver 173 of the second cylindrical part 163.

As shown in FIGS. 10 and 11, the female connection ports 181, 182 formed on the barrel 106 and the crank housing 107 are open in the lateral direction. Therefore, by moving the dynamic vibration reducer 151 generally horizontally toward the side surface of the body 103, the male connection ports 167, 169 of the dynamic vibration reducer 151 are fitted and connected to the female connection ports 181.

As shown in FIG. 10, the one securing part 183 for securing the first cylindrical part 161 is formed by two upper and lower securing pieces 183a which protrude generally horizontally from the side surface of the crank housing 107 in the lateral direction. Correspondingly, a pair of upper and lower mounting projection pieces 171 are formed on the outer surface of the one end portion of the first cylindrical part 161 in the longitudinal direction (see FIG. 6) and extend in a direction transverse to the longitudinal direction of the first cylindrical part 161. As shown in FIG. 9, the other securing part 184 for securing the spring receiver 173 of the second cylindrical part 163 is formed by a securing piece which protrudes generally horizontally from the side surface of the crank housing 107 in the lateral direction, and the securing piece has a recess 184a which is engaged with the protruding end of the spring receiver 173.

The dynamic vibration reducer 151 is mounted to the body 103 by moving the dynamic vibration reducer 151 generally horizontally toward the body 103. FIGS. 9 to 11 each show a state in which the dynamic vibration reducer 151 is not yet mounted to the body 103 and a state in which the dynamic vibration reducer 151 is already mounted to the body 103. A tip end of each of the upper and lower projection pieces 171 is shaped like a hook and has an inclined surface 171a (see FIG. 6). Further, a tip end of the other securing part 184 has an inclined surface 184b (see FIG. 9).

Therefore, when the inclined surfaces 171a of the upper and lower projection pieces 171 are pressed against the upper and lower securing pieces 183a of the one securing part 183 and the protruding end of the spring receiver 173 is pressed against the inclined surface 184b of the other securing part 184 and pushed, the upper and lower projection pieces 171 of the first cylindrical part 161 are engaged with the upper and lower securing pieces 183a and the protruding end of the spring receiver 173 is engaged with the recess 184a of the other securing part 184, under the spring forces of the biasing springs 157, 159. Thus, the cylindrical part 153 of the dynamic vibration reducer 151 is secured to the securing part 183 under the spring forces of the biasing springs 157, 159. At the same time, the male connection ports 167, 169 of the dynamic vibration reducer 151 are fitted into the female connection ports 181, 182, respectively. As a result, the dynamic vibration reducer 151 is mounted to the body 103 such that the longitudinal direction of the cylindrical body 153 is parallel to the axial direction of the hammer bit 119.

In the mounted state, the dynamic vibration reducer 151 is supported by the securing part 183 in the state in which the first cylindrical part 161 and the spring receiver 173 of the second cylindrical part 163 are subjected to the spring forces of the biasing springs 157, 159, so that this supported state can be maintained. Further, the first cylindrical part 161 is supported by engagement of the upper and lower projection pieces 171 on the outside of the first cylindrical part 161 with the securing part 183 on the body 103 side. Thus, the first cylindrical part 161 can be rationally supported at a point inward of the front end surface toward the center in the longitudinal direction.

In the process of the above-described mounting operation, the spring receiver 173 is pushed into the second cylindrical part 163 against the biasing spring 159, so that the securing part 183 receives the spring force of the biasing spring 159 via the spring receiver 173 and thus the second cylindrical part 163 is not subjected to the spring force of the biasing spring 159. Therefore, the second cylindrical part 163 is allowed to move with respect to the inner cylindrical part 165 in the longitudinal direction, while the outer sleeve 166 is allowed to move with respect to the first cylindrical part 161. As a result, even if dimensional errors (variations) are caused between the spacing of the male connection ports 167, 169 on the dynamic vibration reducer 151 side and the spacing of the female connection ports 181, 182 on the body 103 side, these errors can be accommodated so that the male connection ports 167, 169 can be connected to the female connection ports 181, 182 without trouble.

The vent hole 182a of the female connection port 182 on the crank housing 107 side communicates with the crank chamber 187 that houses the motion converting mechanism, and the vent hole 181a of the female connection port 181 on the barrel 106 side communicates with an inner space of the barrel 106 that houses the cylinder 141, or an barrel inner space 185 between an inner surface of the barrel 106 and an outer surface of the cylinder 141. Therefore, in the state in which the dynamic vibration reducer 151 is mounted to the body 103, in the inner space on both sides of the weight 155 of the dynamic vibration reducer 151, an inner space 191 on the first cylindrical part 161 side and an inner space 193 on the second cylindrical part 163 side communicate with the barrel inner space 185 and the crank chamber 187, respectively. Further, the dynamic vibration reducer 151 mounted on the body 103 can be removed from the body 103 as necessary by pulling out the dynamic vibration reducer 151 in the lateral direction of the body 103 while applying a force in a direction that moves the first and second cylindrical parts 161, 163 toward each other.

Operation of the electric hammer 101 constructed as described above is now described. When the driving motor is driven, its rotational output is converted into linear motion via the motion converting mechanism and then causes the hammer bit 119 to perform a hammering movement in the axial direction via the striking mechanism. As a result, a hammering operation is performed on a workpiece.

In this embodiment, in the dynamic vibration reducer 151, the rear inner space 193 of the second cylindrical part 163 communicates with the crank chamber 187 and the front inner space 191 of the first cylindrical part 161 communicates with the barrel inner space 185. The crank chamber 187 is an enclosed space sealed from the outside, so that pressure within the crank chamber 187 fluctuates when the motion converting mechanism is driven. This is caused by linear movement of a component of the motion converting mechanism in the form of the piston within the cylinder. Specifically, when the piston moves forward (when the piston moves in the longitudinal direction in order to cause the hammer bit 119 to perform the hammering movement), the volume of the crank chamber 187 is increased by the forward movement of the piston, so that pressure within the crank chamber 187 is reduced. Further, when the piston moves backward, the volume of the crank chamber 187 is reduced, so that pressure within the crank chamber 187 is increased.

On the other hand, the barrel inner space 185 does not communicate with the crank chamber 187 and it is designed as an independent enclosed space. When the piston is moved forward, a component of the striking mechanism in the form of the striker is moved forward within the cylinder via an air spring and an impact force is applied to the hammer bit via the impact bolt. At this time, the cylinder inner space between the striker and the impact bolt is compressed and thus the air in the cylinder inner space is pushed out into the barrel inner space 185 through a vent hole formed on the cylinder. Therefore, pressure within the barrel inner space 185 increases. When the striker is returned to its initial position, the above-described cylinder inner space is enlarged and thereby air within the barrel inner space 185 is taken into the cylinder inner space, so that pressure within the cylinder is reduced.

As described above, when the electric hammer 101 is driven, pressures within the crank chamber 187 and the barrel inner space 185 are fluctuated when the motion converting mechanism or the striking mechanism is driven. The pressure fluctuations have a phase difference of about 180 degrees. Specifically, when pressure within the crank chamber 187 is increased, pressure within the barrel inner space 185 is reduced. Further, when pressure within the crank chamber 187 is reduced, pressure within the barrel inner space 185 is increased. In this embodiment, pressure within the inner space of the body 103 which fluctuates as described above is introduced into the inner spaces 191, 193 of the first and second cylindrical parts 161, 163 of the dynamic vibration reducer 151. Specifically, the dynamic vibration reducer 151 performs a vibration reducing function by forced vibration in which the weight 155 of the dynamic vibration reducer 151 is actively driven by utilizing pressure fluctuations within the crank chamber 187 and the barrel inner space 185. Thus, vibration caused in the body 103 during hammering operation can be effectively reduced.

In this embodiment, when the modularized dynamic vibration reducer 151 of a forced vibration type utilizing the above-described pressure fluctuations is mounted to the body 103, the male connection ports 167, 169 formed in the cylindrical body 153 of the dynamic vibration reducer 151 are fitted into the female connection ports 181, 182 on the body 103 side. At the same time, the inner spaces 191, 193 of the dynamic vibration reducer 151 communicate with the crank chamber 187 which is the inner space of the body 103, and with the barrel inner space 185. At this time, variations in production or assembly may exist between the spacing between the two male connection ports 167, 169 on the dynamic vibration reducer 151 and the spacing between the corresponding female connection ports 181, 182 on the body 103 side.

According to this embodiment, the one male connection port 167 formed in the outer sleeve 166 can be moved with respect to the first cylindrical part 161 in the longitudinal direction and the other male connection port 169 formed in the second cylindrical part 163 can be moved with respect to the inner cylindrical part 165 in the longitudinal direction. Therefore, when the both male connection ports 167, 169 are fitted into the female connection ports 181, 182, the spacing between the male connection ports 167, 169 is adjusted to correspond to the spacing between the female connection ports 181, 182. Thus, the variations can be accommodated and thus the male connection ports 167, 169 can be attached to the female connection ports 181, 182 without trouble.

Further, the front first cylindrical part 161 has a cylindrical shape having a bottom at a closed end. The front first cylindrical part 161 receives the spring force of the biasing spring 157 on the bore bottom, or specifically, the first cylindrical part 161 has the functions of both the second cylindrical part 163 and the spring receiver 173. With this construction, in which the spring receiver 173 is dispensed with, the dynamic vibration reducer 151 can be correspondingly reduced in the length in the longitudinal direction and thus can be reduced in size, compared with the construction of the second cylindrical part 163 in which the spring receiver 173 is provided to receive the spring force of the biasing force 159. As a result, a space required for installing the dynamic vibration reducer 151 on the body 103 side can be reduced.

Further, in this embodiment, as for a manner of supporting the dynamic vibration reducer 151 on the body 103, on the first cylindrical part 161 side, the dynamic vibration reducer 151 is not supported at the longitudinal end of the first cylindrical part 161, but by the securing part 183 at a position toward the center in the longitudinal direction from the end (at a position inward of the bore bottom which receives the spring force of the biasing spring 157). With such a construction, the longitudinal length of the dynamic vibration reducer 151 including its securing part (its supporting part) can be further reduced, so that size reduction can be realized.

Further, in the construction in which the front and rear male connection ports 167, 169 of the dynamic vibration reducer 151 are connected to the corresponding female connection ports 181, 182 formed in the barrel 106 and the crank housing 107, the front and rear securing parts 183, 184 for supporting the dynamic vibration reducer 151 are not provided on the barrel 106 and the crank housing 107, but only on the crank housing 107. Therefore, variations in the spacing between the front and rear two securing parts 183, 184 are not caused in assembling.

Further, when the dynamic vibration reducer 151 is disposed utilizing a free space on the lateral side of the crank housing 107, as shown in FIG. 11, the dynamic vibration reducer 151 is disposed on a lower part of a lateral region of the barrel 106. The male connection port 167 is designed to protrude horizontally from a position displaced above from the center of the first cylindrical part 161 of the male connection port 167 and thus the male connection port 167 can be rationally connected to the female connection port 181 of the barrel 106.

Further, in the connecting construction as described above, in this embodiment, the two upper and lower communication holes 161*b*, 161*c* are provided on the first cylindrical part 161. In the dynamic vibration reducer 151 disposed on the right side of the body 103, the male connection port 167 can communicate with the inner space 191 via the one communication hole 161*b*, and in the dynamic vibration reducer 151 disposed on the left side of the body 103, the male connection port 167 can communicate with the inner space 191 via the other communication hole 161*c*. Thus, the first cylindrical part 161 can be used in common for the right and left dynamic vibration reducers 151.

The dynamic vibration reducer 151 attached to the body 103 can be removed from the body 103 as necessary. Further, the first and second cylindrical parts 161, 163 are connected to each other via the engagement parts 161*a*, 163*a* engaged with each other by moving (turning) the first and second cylindrical parts 161, 163 with respect to each other in the circumferential direction and disconnected from each other by relative movement in the reverse directions. Therefore, the first cylindrical part 161 and the second cylindrical part 163 can be easily connected or disconnected from each other without using a specific tool, and in the disconnected state, the first cylindrical part 161 and the second cylindrical part 163 can be separated from each other for maintenance of the weight 155 and the biasing springs 157, 159 which are disposed within the cylindrical parts.

Second Representative Embodiment

Figure 12:
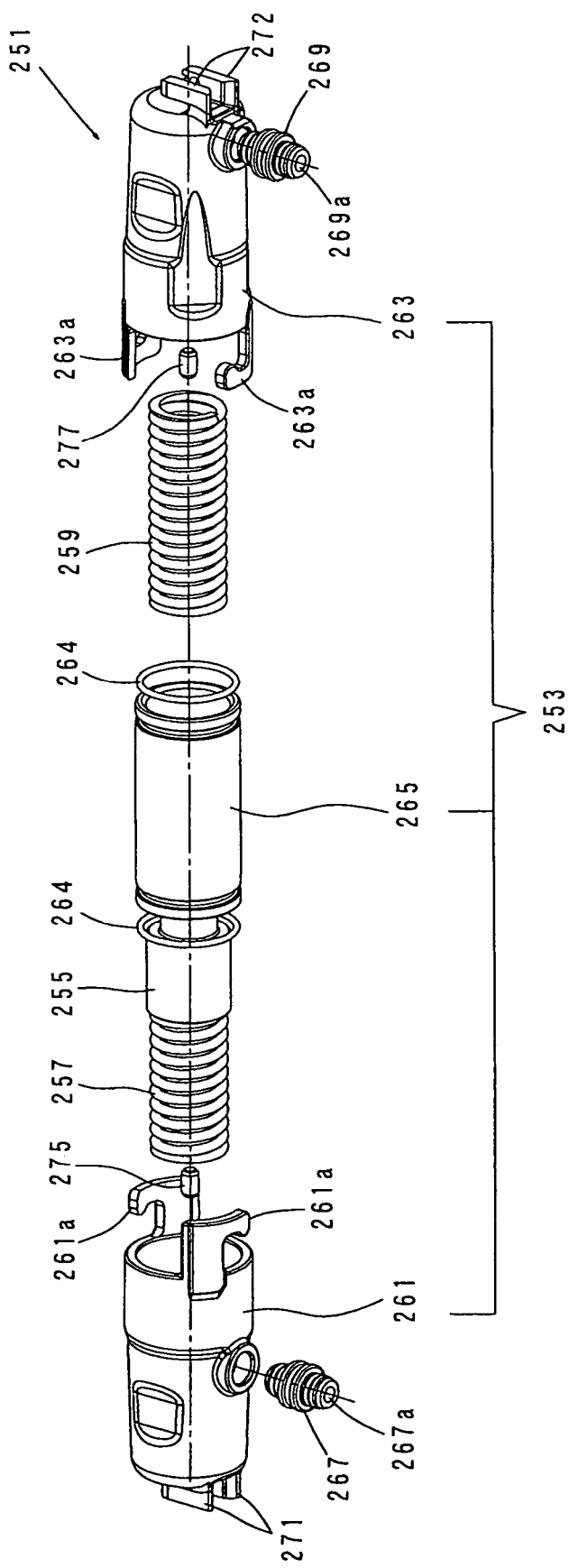
FIG. 12 is an exploded perspective view showing the construction of a dynamic vibration reducer according to a second embodiment of the invention.

A second embodiment of the invention is now described with reference to FIGS. 12 to 18. The electric hammer according to the second representative embodiment has the same construction as in the above-described first embodiment and is therefore described using identical numerals for the same components as in the first embodiment as necessary. Firstly, the construction of a dynamic vibration reducer 251 according to this embodiment is described with reference to FIGS. 12 to 14. The dynamic vibration reducer 251 according to this embodiment mainly includes an elongate hollow cylindrical body 253, a weight 255 disposed within the cylindrical body 253 and biasing springs 257, 259 which are disposed on both sides of the weight 255 (the right and left sides of the weight 255 as shown in FIG. 12) in order to connect the weight 255 to the cylindrical body 253. The cylindrical body 253, the weight 255 and the biasing springs 257, 259 are features that correspond to the "body", the "weight" and the "elastic element", respectively, according to the invention.

The cylindrical body 253 includes a front first cylindrical part 261, a rear second cylindrical part 263 and an inner cylindrical body 265 between the first cylindrical part 261 and the second cylindrical part 263. The first cylindrical part 261 and the second cylindrical part 263 are opposed to each other and fitted onto the inner cylindrical part 265 such that they can slide with respect to the outer circumferential surface of the inner cylindrical part 265 in the circumferential and longitudinal directions. Specifically, the cylindrical body 253 is formed by assembling the first cylindrical part 261, the second cylindrical part 263 and the inner cylindrical part 265 such that they can move with respect to each other in the longitudinal direction. Further, a sealing member in the form of an O-ring 264 for preventing air leakage is disposed between mating surfaces of the inner cylindrical part 265 and the first and second cylindrical parts 261, 263. The first and second cylindrical parts 261, 263 are features that correspond to the "plurality of cylindrical members" according to the invention.

Figure 13:
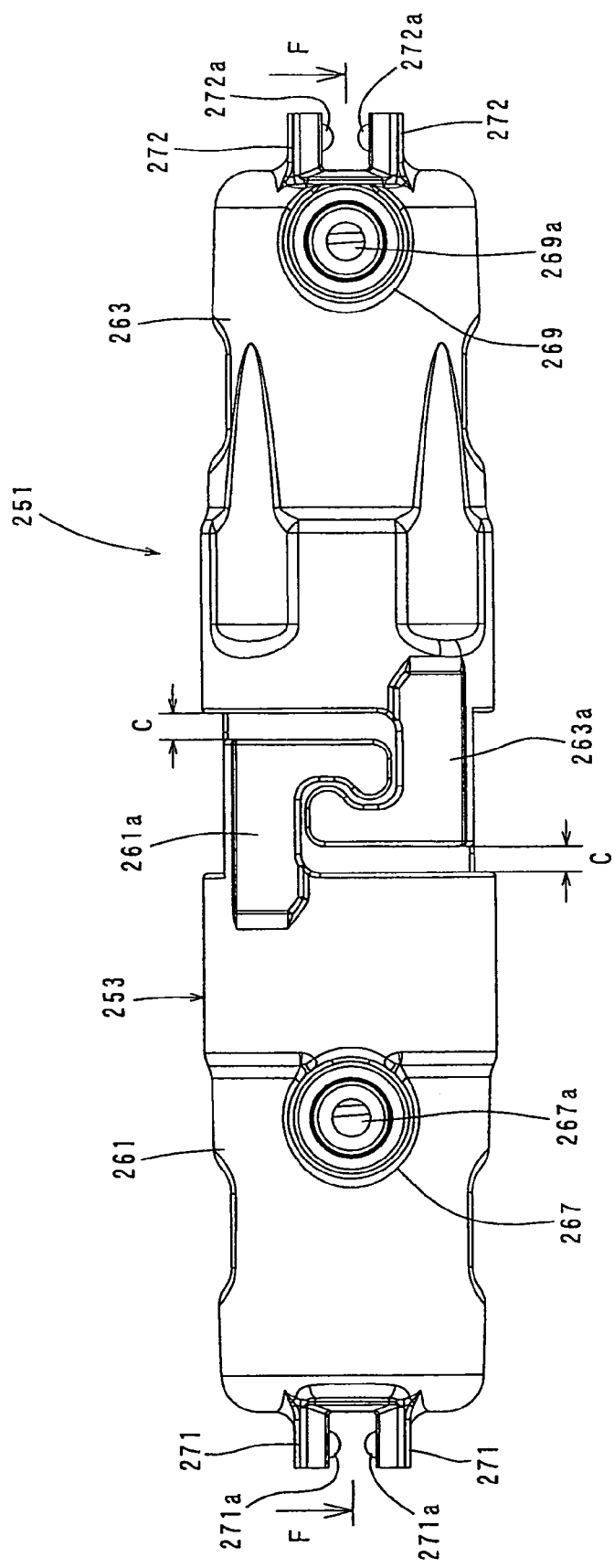
FIG. 13 is a side view showing the dynamic vibration reducer.
Figure 14:
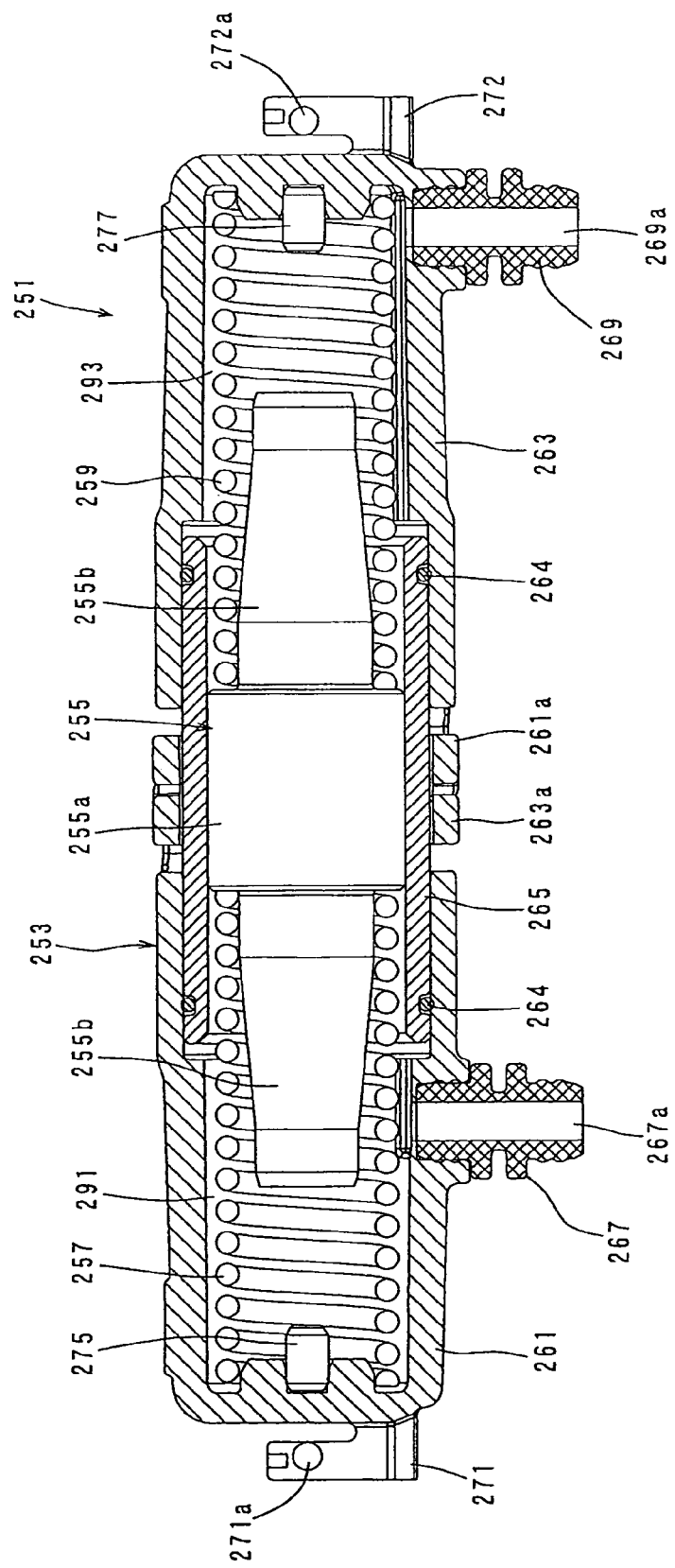
FIG. 14 is a sectional view taken along line F-F in FIG. 13.

As shown in FIGS. 12 and 13, the first and second cylindrical parts 261, 263 are connected to each other via latch-like (hook-like) engaging parts 261a, 263a which are engaged with each other at ends of the cylindrical parts which face each other in the longitudinal direction. The engagement part 261a of the first cylindrical part 261 and the engagement part 263a of the second cylindrical part 263 extend with a predetermined length from respective end surfaces of the cylindrical parts in the longitudinal direction. The engagement parts 261a, 263a are engaged with each other by moving the both cylindrical parts 261, 263 with respect to each other in a circumferential direction in the state in which the cylindrical parts 261, 263 are held close to each other (in the state in which the end surface of the one cylindrical part is held in contact with a tip end of the engaging part of the other cylindrical part). Thus, the first and second cylindrical parts 261, 263 are connected to each other. Therefore, by moving the first and second cylindrical parts 261, 263 with respect to each other in the opposite circumferential direction, the engagement parts 261a, 263a are disengaged from each other, so that the first and second cylindrical parts 261, 263 are disconnected from each other. FIG. 12 shows a disassembled state of the dynamic vibration reducer 251 and FIG. 13 shows an assembled state of the dynamic vibration reducer 251 with the first and second cylindrical parts 261, 263 connected to each other.

The engaging movement of the engaging part 261a and the engagement part 263a for coupling the first cylindrical part 261 and the second cylindrical part 263 is performed against spring forces of the biasing springs 257, 259. In the state in which the both cylindrical parts 261, 263 are connected to each other with the engaging parts 261a, 263a engaged with each other, as shown in FIG. 13, predetermined clearances C are defined between the end surfaces of the first and the second cylindrical parts 261, 263 and the end surface of the opposite engaging parts 261a, 263a in the longitudinal direction, respectively, so that the first and second cylindrical parts 261, 263 can be moved with respect to each other in the longitudinal direction within the range of the respective clearances C. Thus, the entire cylindrical body 253 can expand and contract in the longitudinal direction within the range of the clearances C.

Elastically deformable rubber pipes 267, 269 having respective air vent holes 267a, 269a are provided on the first and second cylindrical parts 261, 263 and radially (horizontally) protrude therefrom. The rubber pipes 267, 269 are connected to the female connection ports 181, 182 having the respective vent holes 181a, 182a on the body 103 of the electric hammer 101. The rubber pipes 267, 269 and the female connection ports 181, 182 are features that correspond to the "ventilating member for forced vibration" and the "ventilating member mounting portion", respectively, according to the invention.

The rubber pipes 267, 269 are inserted into pipe mounting holes formed in the first and second cylindrical parts 261, 263 so as to be mounted thereto, and thus communicate with inner spaces 291, 293 of the first and second cylindrical parts 261, 263. In the state in which the dynamic vibration reducer 251 is not yet attached to the body 103 of the electric hammer 101, as described above, the cylindrical body 253 is held expanded at a maximum (in the state shown in FIG. 13) by spring forces of the biasing springs 257, 259. Therefore, at this time, the spacing between the both rubber pipes 267, 269 is maximized. The spacing between the both rubber pipes 267, 269 can be adjusted by elastic deformation of the rubber pipes 267, 269 themselves and the relative longitudinal movement of the first and second cylindrical parts 261, 263.

Further, in the state in which the both cylindrical parts 261, 263 are connected to each other, the rubber pipe 267 on the first cylindrical part 261 side and the rubber pipe 269 on the second cylindrical part 263 side are located substantially at the same position in the circumferential direction, or on the same line running in the axial direction of the cylindrical body 253.

Each of the first and second cylindrical parts 261, 263 has a cylindrical shape having a bottom at a closed end, and this bore bottom receives spring forces of the biasing springs 257, 259. Therefore, the first cylindrical part 261 has functions of both the second cylindrical part 163 and the spring receiver 173 which are provided in the first embodiment. Further, rubber stoppers 275, 277 are disposed on the bore bottoms of the first and second cylindrical parts 261, 263, and define the foremost position and the rearmost position to which the weight 255 can be moved.

The weight 255 has a large-diameter portion 255a and a small-diameter portion 255b disposed on the both sides of the large-diameter portion 255a, and the large-diameter portion 255a slides on the inner circumferential surface of the inner cylindrical part 265. The biasing springs 257, 259 are disposed on the both sides of the large-diameter portion 255a in the direction of its movement. Each of the biasing springs 257, 259 is formed by a compression coil spring and its one end is held in contact with the bore bottom of the first or second cylindrical part 261, 263, while the other end is held in contact with the end surface of the large-diameter portion 255a of the weight 255 in the longitudinal direction. With this construction, the biasing springs 257, 259 apply the spring forces to the weight 255 toward each other when the weight 255 moves in the longitudinal direction of the cylindrical body 253 (in the axial direction of the hammer bit 119).

Further, a pair of upper and lower mounting projection pieces 271 are integrally formed on the front end surface of the first cylindrical part 261 and horizontally extend opposite to each other, and a pair of upper and lower mounting projection pieces 272 are also integrally formed on the rear end surface of the second cylindrical part 263 and horizontally extend opposite to each other. Spherical projections 271a, 272a are formed on opposed surfaces of the end portions of the mounting projection pieces 271, 272 in the extending direction.

Mounting of the dynamic vibration reducer 251 constructed as described above is now described with reference to FIGS. 15 to 18. In this embodiment, as shown in FIG. 16, in order to mount the dynamic vibration reducer 251 to the body 103 of the power tool 101, the securing part 283 for supporting the first cylindrical part 261 and the securing part 284 for supporting the second cylindrical part 263 as well as the female connection port 181 to be connected to the rubber pipe 267 of the first cylindrical part 261 and the female connection port 182 to be connected to the rubber pipe 269 of the second cylindrical part 263 are provided on each of the right and left side surface regions of the crank housing 107. The securing parts 283, 284 horizontally protrude from the side surface of the crank housing 107 in the lateral direction and are formed by plates having engagement holes 283a, 284a which are penetrated vertically therethrough. The female connection ports 181, 182 are open in the lateral direction.

Figure 15:
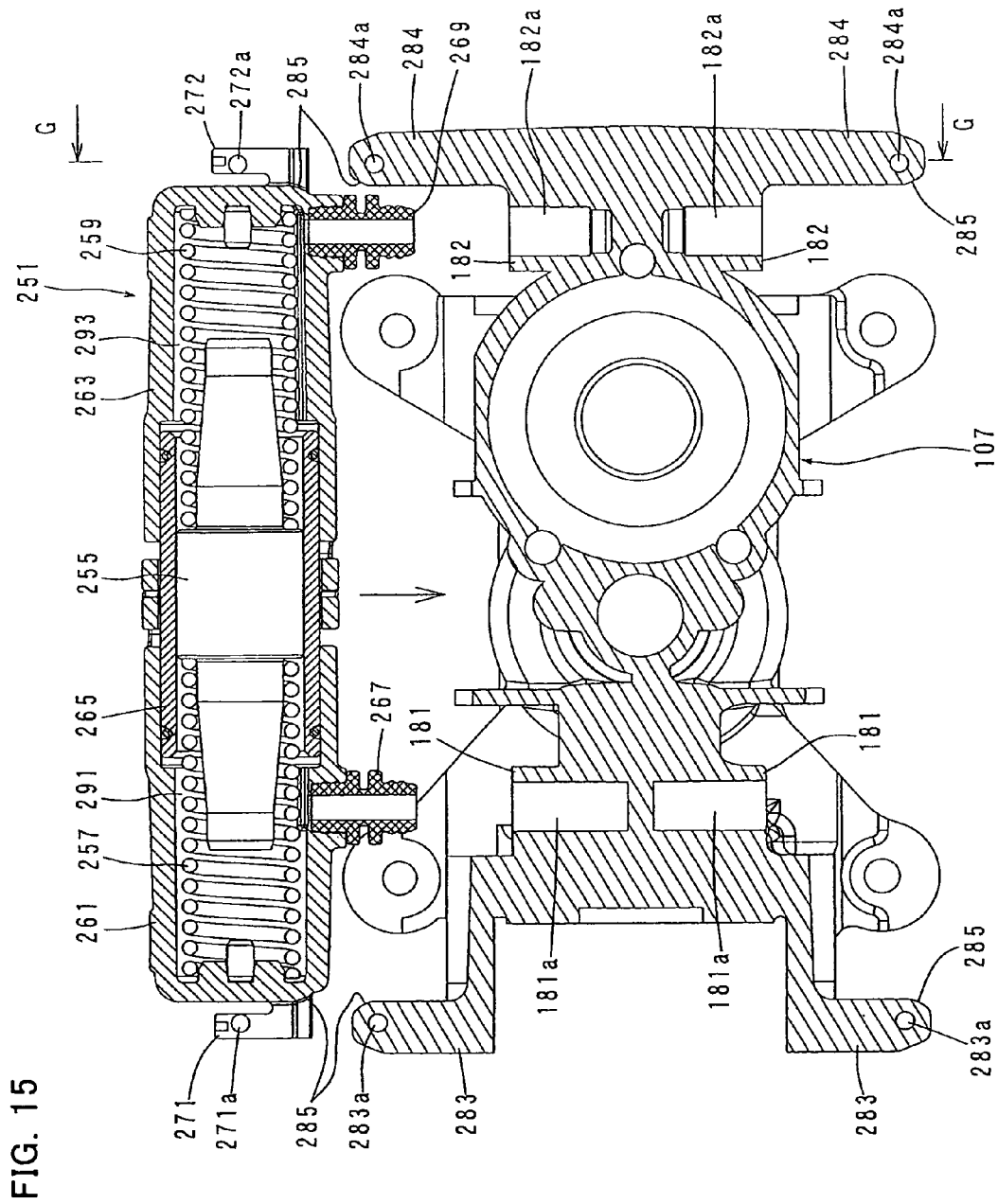
FIG. 15 is a sectional plan view illustrating mounting of the dynamic vibration reducer to the body.
Figure 16:
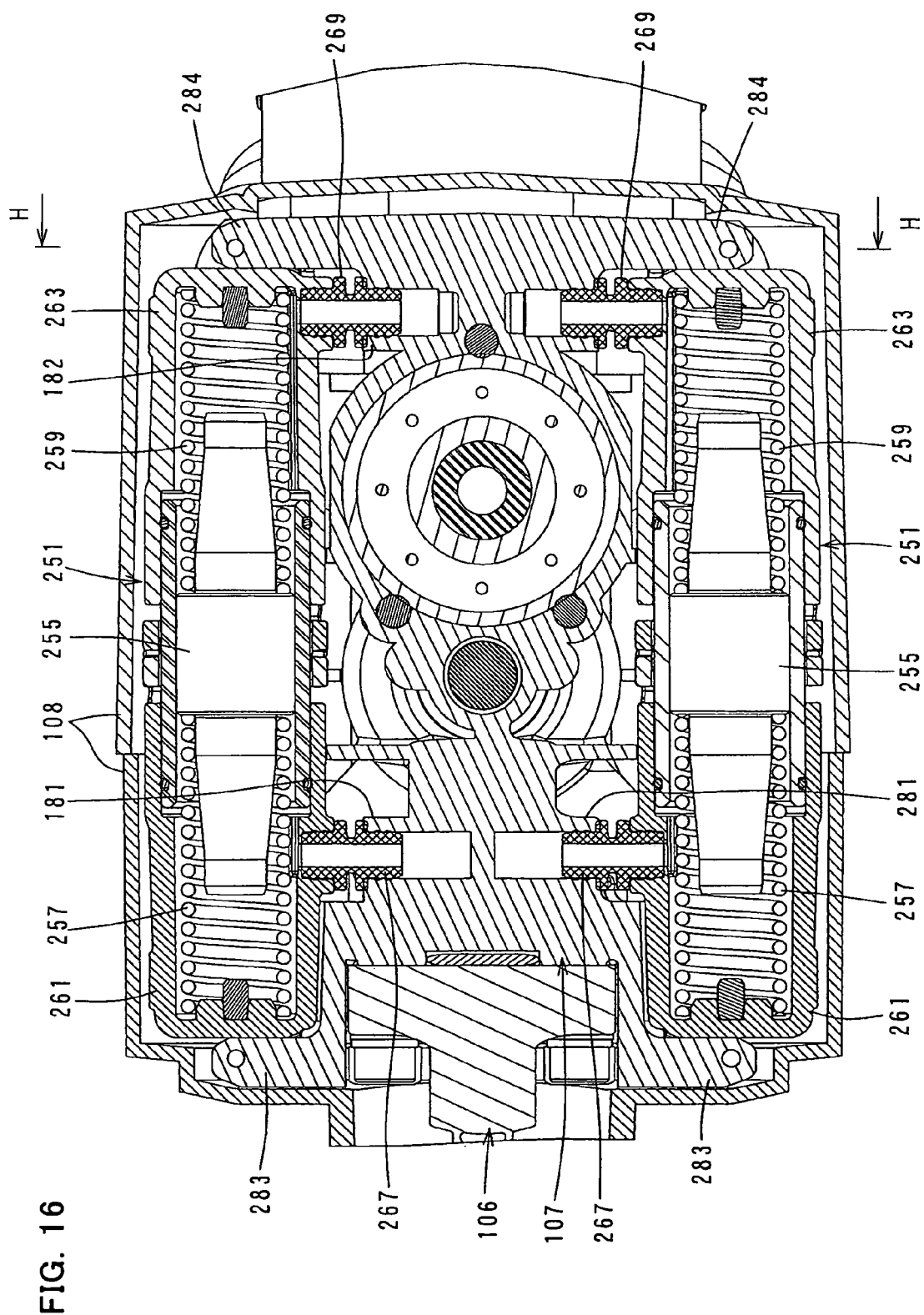
FIG. 16 is a sectional plan view showing the dynamic vibration reducer in the mounted state.
Figure 17:
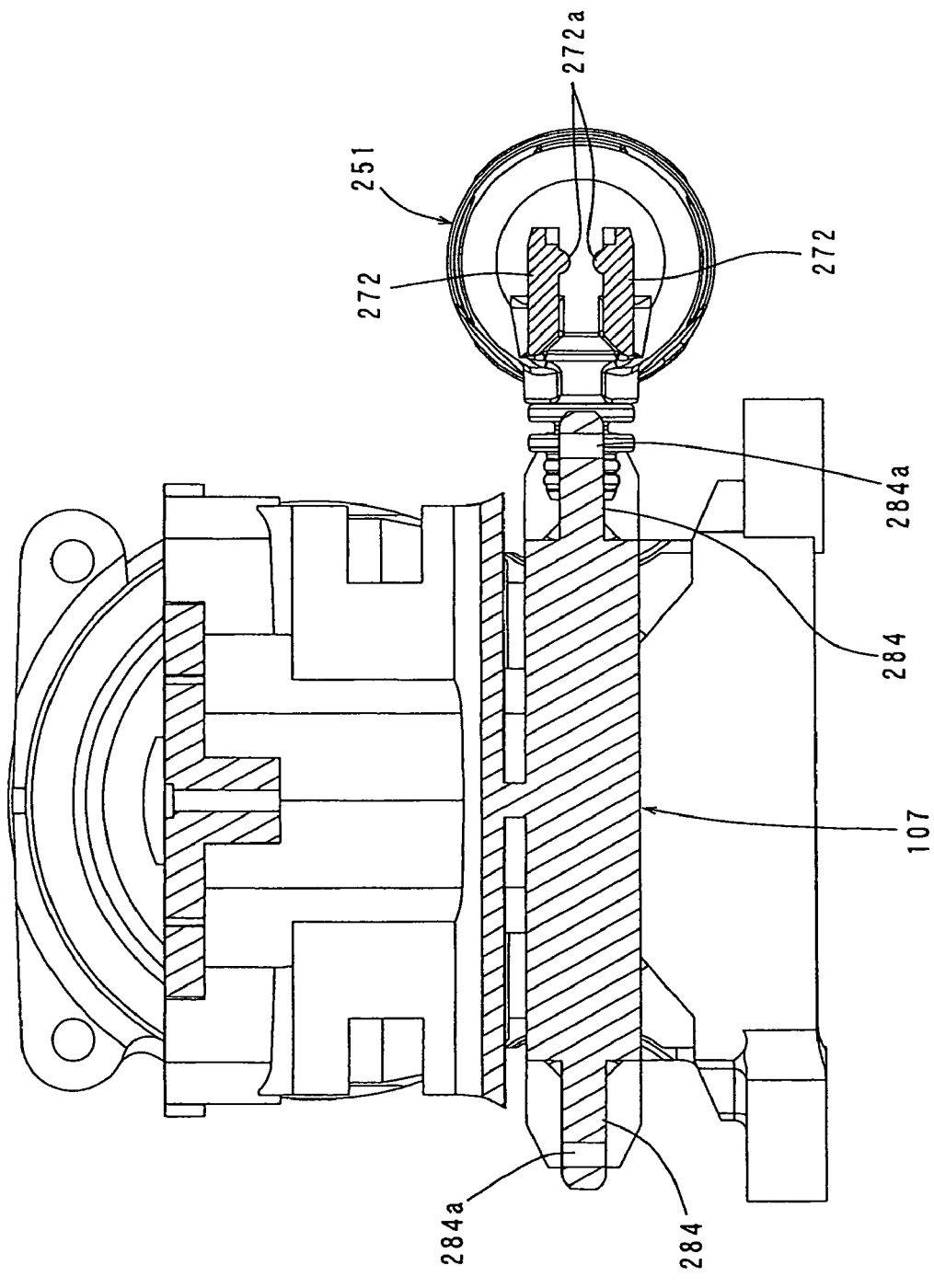
FIG. 17 is a sectional view taken along line G-G in FIG. 15.
Figure 18:
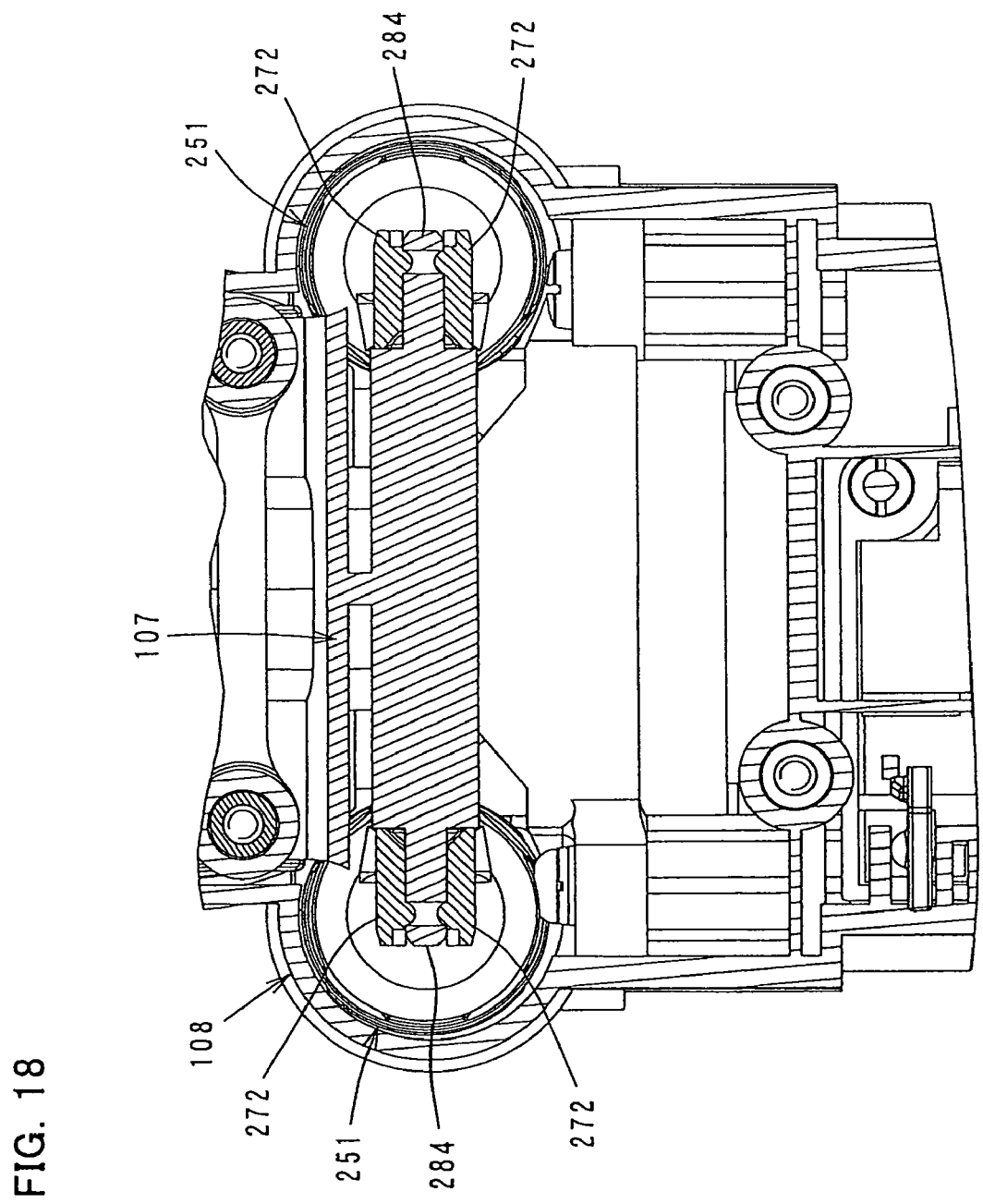
FIG. 18 is a sectional view taken along line H-H in FIG. 16.

Therefore, as shown in FIGS. 15 and 17, the dynamic vibration reducer 251 is positioned such that the rubber pipes 267, 267 of the dynamic vibration reducer 251 are opposed to the female connection ports 181, 182 of the crank housing 107 and such that the securing parts 283, 284 are positioned between the upper and lower mounting projection pieces 271, 272. In this state, when the dynamic vibration reducer 251 is moved horizontally toward the crank housing 107, the rubber pipes 267, 269 are fitted into the opposed female connection ports 181, 182. At the same time, the securing parts 283, 284 are inserted in between the upper and lower mounting projection pieces 271, 272 by utilizing elastic deformation of the mounting projection pieces 271, 272, and the spherical projections 271a, 272a of the mounting projection pieces 271, 272 are engaged with the engagement holes 283a, 284a of the securing parts 283, 284. In this manner, the dynamic vibration reducer 251 is mounted to the body 103 such that its longitudinal direction is parallel to the axial direction of the hammer bit 119. FIGS. 16 and 17 show the dynamic vibration reducer 251 in the mounted state.

According to this embodiment, each of the first and second cylindrical parts 261, 263 has a cylindrical shape having a bottom at a closed end, and this bore bottom receives a spring force of the biasing spring 157. Therefore, each of the first and second cylindrical parts 261, 263 has functions of both the second cylindrical part 163 and the spring receiver 173 which are provided in the first embodiment. With this construction in which the spring receiver 173 is dispensed with, the dynamic vibration reducer 251 can be correspondingly reduced in the length in the longitudinal direction, and thus can be reduced in size. As a result, a space required for installing the dynamic vibration reducer 251 on the body 103 side can be reduced. Further, due to absence of the spring receiver 173, the O-ring 172 between the spring receiver 173 and the second cylindrical part 163 can also be dispensed with, so that corresponding cost reduction can be realized.

In this embodiment, the rubber pipes 267, 269 form the male connection ports for forced vibration. Therefore, even if dimensional errors (variations) are caused between the spacing between the rubber pipes 267, 269 on the dynamic vibration reducer 251 side and the spacing between the female connection ports 181, 182 on the body 103 side, these errors can be accommodated by elastic deformation of the rubber pipes 267, 269 themselves, so that the rubber pipes 267, 269 can be connected to the female connection ports 181, 182 without trouble.

Further, in this embodiment, as shown in FIG. 15, the distance between the inside surfaces of the front and rear securing parts 283, 284 formed on the crank housing 107 is designed to be slightly smaller than the longitudinal outside dimension (the distance between the front end surface of the first cylindrical part 261 and the rear end surface of the second cylindrical part 263) in the free state of the dynamic vibration reducer 251. Therefore, in the mounted state of the dynamic vibration reducer 251 to the body 103, the front end surface of the first cylindrical part 261 and the rear end surface of the second cylindrical part 263 are supported in surface contact with each other by the end surfaces (in the longitudinal direction) of the securing parts 283, 284 while being subjected to spring forces of the biasing springs 257, 259. Furthermore, the securing parts 283, 284 are held between a pair of upper and lower mounting projection pieces 271, 272 and thus also supported in the vertical direction transverse to the longitudinal direction of the dynamic vibration reducer 251. Therefore, the dynamic vibration reducer 251 can be reliably held in the supported state.

Further, a chamfer 285 such as an inclined or round surface is formed as an insertion guide on the ends of the securing parts 283, 284, the front end surface of the first cylindrical part 261 and the rear end surface of the second cylindrical part 263. Thus, attachment of the dynamic vibration reducer 251 to the body 103 can be easily performed.

Further, like in the first embodiment, the vent hole 182a of the one (rear) female connection port 182 formed in the crank housing 107 communicates with the crank chamber (not shown) that houses the motion converting mechanism and the vent hole 181a of the other (front) female connection port 181 communicates with the barrel inner space (not shown) of the barrel 106 that houses the cylinder 141. Therefore, in the state in which the dynamic vibration reducer 251 is attached to the body 103, as for the inner space formed on both sides of the weight 255 of the dynamic vibration reducer 251, the inner space 291 on the first cylindrical part 261 side communicates with the barrel inner space, and the inner space 293 on the second cylindrical part 263 side communicates with the crank chamber. As a result, like in the first embodiment, when the electric hammer 101 is driven and thus the hammering operation is performed by the hammer bit 119, the dynamic vibration reducer 251 is forcibly vibrated, so that vibration caused in the body 103 during hammering operation can be effectively reduced.

The dynamic vibration reducer 251 attached to the body 103 can be removed from the body 103 as necessary by pulling out in the lateral direction of the body 103 while applying a force to it in a direction that moves the first and second cylindrical parts 261, 263 toward each other. In the removed dynamic vibration reducer 251, the first and second cylindrical parts 261, 263 are separated from each other by disengagement of the engagement parts 261a, 263a as necessary, so that maintenance of the weight 255 and the biasing springs 257, 259 disposed within the dynamic vibration reducer 251 can be performed.

In the above-described second embodiment, variations of the spacing can be accommodated by elastic deformation of the rubber pipes 267, 269 themselves. However, the rubber pipes 267, 269 may be changed to rigid pipes and the rigid pipes may be elastically attached to the first and second cylindrical parts 261, 263, for example, by utilizing elastic deformation of a rubber member. Further, when the dynamic vibration reducer 251 is attached to the body 103, the rubber pipes 267, 269 may not be attached to the dynamic vibration reducer 251 but to the body 103 side.

The inner cylindrical parts 165, 265 in the above-described embodiments may be integrally formed with respect to either the first cylindrical parts 161, 261 or the second cylindrical parts 163, 263. Further, in the above-described embodiments, the electric hammer 101 is described as a representative example of the power tool, but the invention is not limited to the electric hammer 101, but can be applied to a hammer drill which allows the hammer bit 119 to perform a hammering movement and a drilling movement.

In accordance with the above-described aspects, following features can preferably be provided.

"The venting member formed on the slide sleeve protrudes horizontally along a horizontal line which runs through a point displaced above from a center of the slide sleeve and is connected to the venting member mounting part of the barrel".

"The cylindrical member on which the slide sleeve is mounted has two upper and lower communication holes, and as for a dynamic vibration reducer disposed on a right side of the tool body, the venting member communicates with one of the communication holes and as for a dynamic vibration reducer disposed on a left side of the tool body, the venting member communicates with the other communication hole".

"The slide sleeve is shaped in plane symmetry with respect to a vertical plane in a direction of a center line of the venting member".

"At least one of the cylindrical members has a pair of upper and lower projection pieces on the side opposed to the other cylindrical member and the projection pieces are supported by the securing part at upper and lower points on the outside of the one cylindrical member".

DESCRIPTION OF NUMERALS

101 electric hammer (power tool)
103 body
105 motor housing
106 barrel
107 crank housing
108 housing cover
109 handgrip
109*a* slide switch
115 dynamic vibration reducer housing space
119 hammer bit (tool bit)
137 tool holder
141 cylinder
151 dynamic vibration reducer
153 cylindrical body
155 weight
155*a* large-diameter portion
155*b* small-diameter portion
157, 159 biasing spring (elastic element)
161 first cylindrical part (cylindrical member)
161*a* engagement part
161*b*, 161*c* communication hole
161*d* projection
163 second cylindrical part (cylindrical member)
163*a* engagement part
163*b* stepped surface
164 O-ring
165 inner cylindrical part
166 outer sleeve (slide sleeve)
166*a* recess
167, 169 male connection port (venting member for forced vibration)
167*a*, 169*a* vent hole
168 O-ring
171 projection piece
171*a* inclined surface
172 O-ring
173 spring receiver
173*a* flange
175, 177 rubber stopper
181, 182 female connection port (venting member mounting part)
181*a*, 182*a* vent hole
183, 184 securing part
183*a* securing piece
184*a* recess
184*b* inclined surface
185 barrel inner space
187 crank chamber
191, 193 inner space
251 dynamic vibration reducer
253 cylindrical body
255 weight
255*a* large-diameter portion
255*b* small-diameter portion
257, 259 biasing spring (elastic element)
261 first cylindrical part (cylindrical member)
261*a* engagement part
263 second cylindrical part (cylindrical member)
263*a* engagement part
264 O-ring
265 inner cylindrical part
267, 269 rubber pipe (venting member for forced vibration)
267*a*, 269*a* vent hole
271, 272 mounting projection piece
271*a*, 272*a* spherical projection
275, 277 rubber stopper
283, 284 securing part
283*a*, 284*a* engagement hole
285 chamfer
291, 293 inner space

What we claim is:

1. A power tool comprising:
    a tool body,
    an actuating mechanism housed in the tool body, the actuating mechanism linearly driving a tool bit,
    a dynamic vibration reducer mounted to the tool body, the dynamic vibration reducer reducing vibration caused when the tool bit is driven, wherein the dynamic vibration reducer includes a body, a weight housed within the body to move in a longitudinal direction of the body, and elastic elements respectively connecting the weight to the body, wherein the body includes a plurality of cylindrical members which are coaxially disposed to face each other and the cylindrical members are assembled into the body such that the cylindrical members can move with respect to each other in the longitudinal direction and each elastic element exerts biasing force on the cylindrical members such that the cylindrical members are held apart from each other, and the cylindrical members are fixed to the tool body under the biasing forces of the elastic elements,
    a venting member mounting part provided on the tool body,
    a venting member provided on each of the cylindrical members to protrude radially outward from the cylindrical member, each venting member being configured to cause a forced vibration, wherein each venting member is inserted into the venting member mounting part in a direction transverse to the longitudinal direction of the cylindrical member, wherein at least one of the venting members is movable with respect to the cylindrical member in the longitudinal direction of the cylindrical member.

2. The power tool as defined in claim 1, further comprising an elastic element receiving surface that receives the biasing force of a corresponding elastic element and a securing part provided on the tool body, wherein the cylindrical member is fixed inward of the elastic element receiving surface toward a center of the dynamic vibration reducer in the longitudinal direction by the securing part under the biasing force of the corresponding elastic element.

3. The power tool as defined in claim 1, further comprising a cylindrical slide sleeve provided on at least one cylindrical member, the slide sleeve being slidable in the longitudinal direction of the at least one cylindrical member, wherein the venting member is formed on the slide sleeve.

4. The power tool as defined in claim 3, wherein the venting member on the slide sleeve protrudes horizontally along a horizontal line which runs through a point displaced above from a center of the slide sleeve and is connected to the venting member mounting part of the barrel.

5. The power tool as defined in claim 3, wherein the at least one cylindrical member on which the slide sleeve is mounted has upper and lower communication holes and wherein the venting member communicates with one of the communication holes with respect to the dynamic vibration reducer disposed on a right side of the tool body, while the venting member communicates with the other of the communication holes with respect to the dynamic vibration reducer disposed on a left side of the tool body.

6. The power tool as defined in claim 3, wherein the slide sleeve is shaped in plane symmetry with respect to a vertical plane in a direction of a center line of the venting member.

7. The power tool as defined in claim 1, wherein the tool body includes two housings to house the actuating mechanism, and the dynamic vibration reducer is mounted astride the two housings.

8. The power tool as defined in claim 1, wherein the venting member is formed by a separate member from the cylindrical member and elastically mounted to the cylindrical member.

9. The power tool as defined in claim 8, wherein the venting member is formed by a rubber pipe.

10. The power tool as defined in claim 8, wherein the tool body includes two housings to house the actuating mechanism, and the dynamic vibration reducer is mounted to one of the two housings.

11. The power tool as defined in claim 1, wherein a sealing part to seal an inner space of the body from an outside of the body is provided between at least two cylindrical members inward of elastic element receiving surfaces of the cylindrical members that receives the biasing force of the elastic element and toward the center of the dynamic vibration reducer in the longitudinal direction.

12. The power tool as defined in claim 1, wherein at least one of the cylindrical members has a pair of upper and lower projection pieces on a side opposed to another cylindrical member and the projection pieces are supported by a securing part at upper and lower points on the outside of the one cylindrical member.

* * * * *